(12) United States Patent
Ito et al.

(10) Patent No.: US 6,848,187 B2
(45) Date of Patent: Feb. 1, 2005

(54) ROTATION ANGLE DETECTOR

(75) Inventors: Shigeji Ito, Niwa-gun (JP); Yasuhiko Futamura, Niwa-gun (JP); Shigenori Nitta, Niwa-gun (JP); Mikihisa Araki, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/362,810

(22) PCT Filed: Sep. 21, 2001

(86) PCT No.: PCT/JP01/08265

§ 371 (c)(1), (2), (4) Date: Feb. 27, 2003

(87) PCT Pub. No.: WO02/25217

PCT Pub. Date: Mar. 28, 2002

(65) Prior Publication Data

US 2003/0177649 A1 Sep. 25, 2003

(30) Foreign Application Priority Data

Sep. 25, 2000 (JP) ........................................ 2000-290697
Sep. 28, 2000 (JP) ........................................ 2000-296198

(51) Int. Cl.$^7$ ............................. G01B 11/26; G01B 7/30
(52) U.S. Cl. .......................... 33/1 PT; 33/707; 33/708; 702/151
(58) Field of Search ................................. 33/1 PT, 1 N, 33/706, 707, 708; 324/207.21, 207.25, 207.14, 207.26, 244.1; 338/32 R; 702/145, 151

(56) References Cited

U.S. PATENT DOCUMENTS 5,065,324 A * 11/1991 Oshita et al. ................. 701/41
5,311,666 A * 5/1994 Jacobsen et al. ............. 33/1 PT
6,170,162 B1 * 1/2001 Jacobsen et al. ............. 33/1 PT
6,330,522 B1 * 12/2001 Takeuchi ..................... 702/151
6,512,589 B1 * 1/2003 Rodi ........................... 356/617
6,574,876 B2 * 6/2003 Takeuchi ..................... 33/1 PT

FOREIGN PATENT DOCUMENTS

| EP | 0 714 171 | 5/2001 |
| JP | 63-118614 | 5/1988 |
| JP | 04-001521 | 1/1992 |
| JP | 06-221873 | 8/1994 |

* cited by examiner

Primary Examiner—G. Bradley Bennett
Assistant Examiner—R. Alexander Smith
(74) Attorney, Agent, or Firm—Mark D. Simpson; Synnestvedt & Lechner LLP

(57) ABSTRACT

A rotation angle detector that is able to detect an absolute rotation angle of a detection body accurately and is able to reduce the installation space required. The rotation angle detector includes a first rotation angle detector connected to the detection body for generating a first detection signal having a cycle corresponding to the rotation of the detection body. The first rotation angle detector includes a first rotating body which is connected to the detection body and rotates together with the detection body. The detector includes a second rotation angle detector connected to the first rotation angle detector. The second rotation angle detector includes a second rotating body that rotates together with the first rotating body at a rate greater than that of the first rotating body, and generates a second detection signal having a cycle corresponding to the rotation of the second rotation body. The control device detects an absolute rotation angle of the detection body in accordance with the first detection signal and the second detection signal.

21 Claims, 17 Drawing Sheets

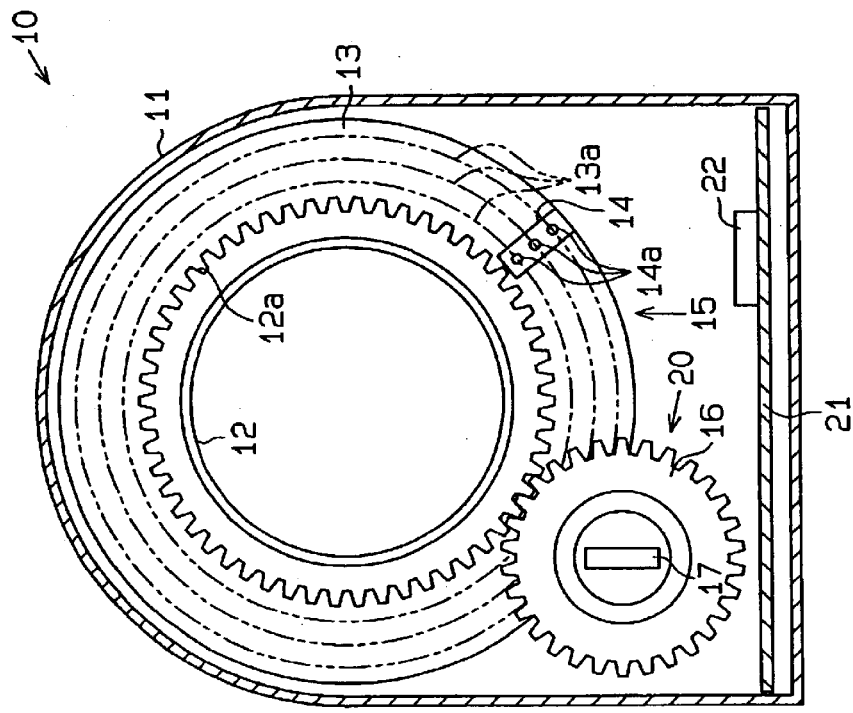
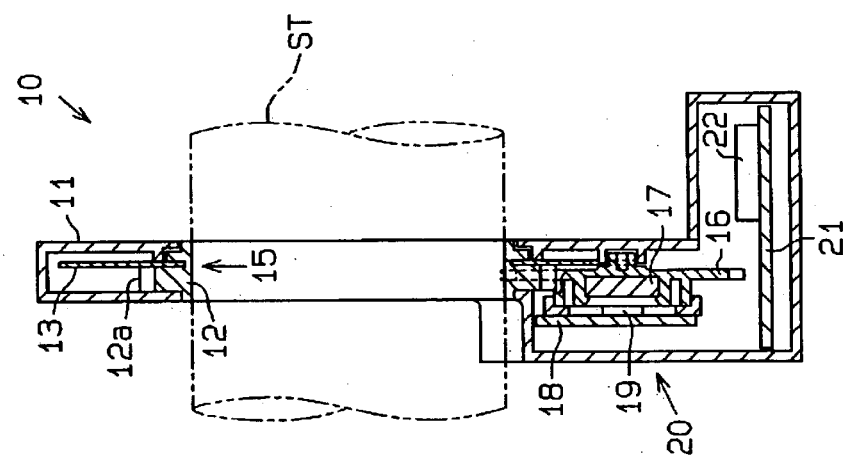

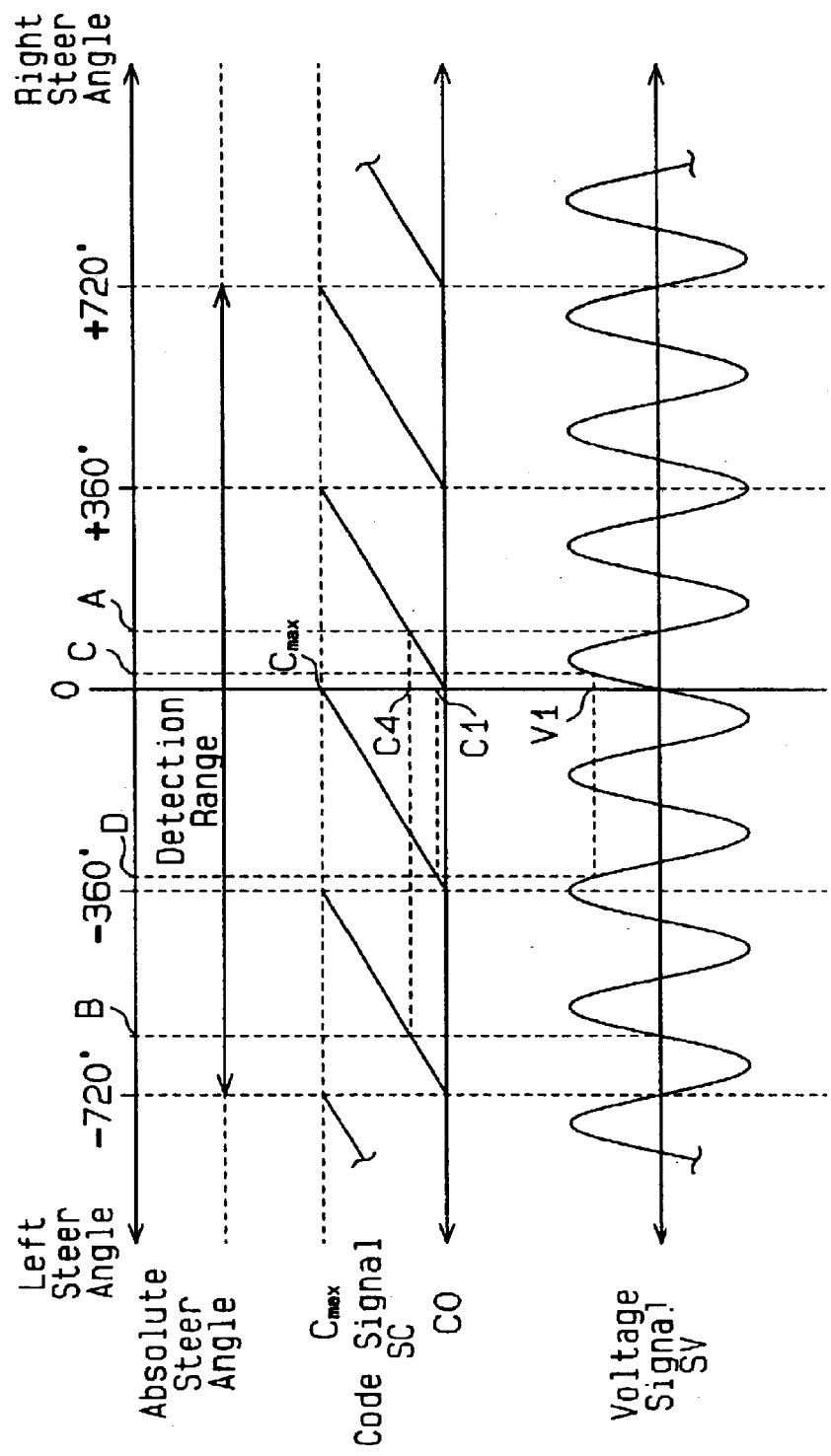

Fig.6

| Absolute Steer Angle | Code Value LC | Voltage Value LV | Change of Voltage Value When Code Value Increases | Change of Voltage Value When Code Value Decreases |
|---|---|---|---|---|
| 720 | C0 | 0 | | |
| 360+334.1 | C13 | V1 | − | + |
| +282.7 | C11 | V1 | + | − |
| +257.0 | C10 | 0 | + | − |
| +231.3 | C9 | −V1 | + | − |
| +179.9 | C7 | −V1 | − | + |
| +159.2 | C6 | 0 | − | + |
| +128.5 | C5 | V1 | − | + |
| + 77.1 | C3 | V1 | + | − |
| + 51.4 | C2 | 0 | + | − |
| 360+ 25.7 | C1 | −V1 | + | − |
| 360 | C0 | −V$_{max}$ | | |
| +334.1 | C13 | −V1 | − | + |
| +308.4 | C12 | 0 | − | + |
| +282.7 | C11 | V1 | − | + |
| +231.3 | C9 | V1 | + | − |
| +205.6 | C8 | 0 | + | − |
| +179.9 | C7 | −V1 | + | − |
| +128.5 | C5 | −V1 | − | + |
| +102.8 | C4 | 0 | − | + |
| + 77.1 | C3 | V1 | − | + |
| + 25.7 | C1 | V1 | + | − |
| 0 | C0 | 0 | | |
| −360+334.1 | C13 | −V1 | + | − |
| +282.7 | C11 | −V1 | − | + |
| +257.0 | C10 | 0 | − | + |
| +231.3 | C9 | V1 | − | + |
| +179.9 | C7 | V1 | + | − |
| +159.2 | C6 | 0 | + | − |
| +128.5 | C5 | −V1 | + | − |
| + 77.1 | C3 | −V1 | − | + |
| + 51.4 | C2 | 0 | − | + |
| −360+ 25.7 | C1 | V1 | − | + |
| −360 | C0 | V$_{max}$ | | |
| −720+334.1 | C13 | V1 | + | − |
| +308.4 | C12 | 0 | + | − |
| +282.7 | C11 | −V1 | + | − |
| +231.3 | C9 | −V1 | − | + |
| +205.6 | C8 | 0 | − | + |
| +179.9 | C7 | V1 | − | + |
| +128.5 | C5 | V1 | + | − |
| +102.8 | C4 | 0 | + | − |
| + 77.1 | C3 | −V1 | + | − |
| −720+ 25.7 | C1 | −V1 | − | + |
| −720 | C0 | 0 | | |

| Detection Value | | | | | | | | | | | | | | | | | | R Buffer | L Buffer |
|---|---|---|---|---|---|---|---|---|---|---|---|---|---|---|---|---|---|---|---|
| 0 | 1 | 0 | 0 | 0 | 0 | 1 | 0 | 1 | 1 | 1 | 1 | 0 | 1 | 0 | 1 | 0 | | | |
| | | | | | | 0 | | 1 | | | | | | | | | | 100001 | 100010 |
| | | | | | 0 | | 0 | | | | | | | | | | | 100001 | 010001 |
| | | | | | | 0 | | 0 | | | | | | | | | | 000010 | 000001 |
| | | | | | | | 0 | | 1 | | | | | | | | | 000010 | 000100 |
| | | | | | | | | 0 | | 1 | | | | | | | | 000101 | 000110 |
| | | | | | | | | | 0 | | 0 | | | | | | | 000101 | 000011 |
| | | | | | | | | | | 1 | | 1 | | | | | | 001011 | 010011 |
| | | | | | | | | | | | 0 | | 1 | | | | | 001011 | 001101 |
| | | | | | | | | | | | | 0 | | 1 | | | | 010111 | 001111 |
| | | | | | | | | | | | | | 1 | | 1 | | | 010111 | 100111 |
| | | | | | | | | | | | | | | 1 | | 1 | | 101111 | 110111 |
| | | | | | | | | | | | | | | | 0 | | 1 | 101111 | 011111 |
| | | | | | | | | | | | | | | | | 1 | 0 | 011110 | 011101 |
| | | | | | | | | | | | | | | | | 1 | 1 | 011110 | 101110 |

Clockwise Direction ↓

| Detection Value | 0 1 0 0 0 0 1 0 1 1 1 1 0 1 0 1 0 | L Buffer | R Buffer |
|---|---|---|---|
| 13→ (boxes) | | | |
| | 0 1 | 000010 | 000001 |
| | 0 0 | 000010 | 000100 |
| | 0 0 | 000101 | 000110 |
| | 0 1 | 000101 | 000011 |
| | 0 1 | 001011 | 010011 |
| | 0 0 | 001011 | 001101 |
| | 1 1 | 010111 | 001111 |
| | 0 1 | 010111 | 100111 |
| | 0 1 | 101111 | 110111 |
| | 1 1 | 101111 | 011111 |
| | 1 1 | 011110 | 011101 |
| | 1 1 | 011110 | 101110 |
| | 1 0 | 111101 | 111110 |
| | 1 1 | 111101 | 111011 |

12a 12b 12c 12d

Counter-clockwise Direction ↑

Writing of Detection Value to the R Buffer

Writing of Detection Value to the L Buffer

Fig.16A

|  | C1 | C2 | C3 | C4 | C5 | C6 | C7 | C8 | C9 |
|---|---|---|---|---|---|---|---|---|---|
| | 12a | 12b | 12c | 12d | | | | | |
| | 12a | 12b | 12c | 12d | | | | | |
| | | 12a | 12b | 12c | 12d | | | | |
| | | | 12a | 12b | 12c | 12d | | | |
| | | | | 12a | 12b | 12c | 12d | | |
| | | | | | 12a | 12b | 12c | 12d | |
| | | | | | | 12a | 12b | 12c | 12d |

Detection Value

Clockwise Direction ↓

Counter-clockwise Direction ↑

Fig.16B

R Buffer

| – | – | – | – | – | – |
|---|---|---|---|---|---|
| – | – | C3 | – | – | C6 |
| – | C2 | C3 | – | C5 | C6 |
| C2 | C4 | C4 | C5 | C6 | C7 |
| C2 | C3 | C4 | C5 | C6 | C7 |
| C3 | C4 | C5 | C6 | C7 | C8 |
| C3 | C4 | C5 | C6 | C7 | C8 |

Clockwise Direction ↓

Fig.16C

L Buffer

| C1 | C2 | C3 | C4 | C5 | C6 |
|---|---|---|---|---|---|
| C2 | C3 | C4 | C5 | C6 | C7 |
| C2 | C3 | C4 | C5 | C6 | C7 |
| C3 | C4 | C5 | C6 | C7 | C8 |
| C3 | – | C5 | C6 | – | C8 |
| – | C5 | – | – | C8 | – |
| – | – | – | – | – | – |

Counter-clockwise Direction ↑

Fig.17

| Absolute Rotation Angle | R Buffer | Absolute Rotation Angle | L Buffer |
|---|---|---|---|
| 0~a | 100001 | ~b | 000010 |
| a~2a | 000010 | b~(a+b) | 000101 |
| 2a~3a | 000101 | (a+b)~(2a+b) | 001011 |
| 3a~4a | 001011 | (2a+b)~(3a+b) | 010111 |
| 4a~5a | 010111 | (3a+b)~(4a+b) | 101111 |
| 5a~6a | 101111 | (4a+b)~(5a+b) | 011110 |
| 6a~7a | 011110 | (5a+b)~(6a+b) | 111101 |
| 7a~8a | 111101 | (6a+b)~(7a+b) | 111010 |
| 8a~9a | 111010 | (7a+b)~(8a+b) | 110101 |
| 9a~10a | 110101 | (8a+b)~(9a+b) | 101010 |
| 10a~11a | 101010 | (9a+b)~(10a+b) | 010101 |
| 11a~12a | 010101 | (10a+b)~(11a+b) | 101011 |
| 12a~13a | 101011 | (11a+b)~(12a+b) | 010110 |
| 13a~14a | 010110 | (12a+b)~(13a+b) | 101100 |
| 14a~15a | 101100 | (13a+b)~(14a+b) | 011001 |
| 15a~16a | 011001 | (14a+b)~(15a+b) | 110011 |
| 16a~17a | 110011 | (15a+b)~(16a+b) | 100110 |
| 17a~18a | 100110 | (16a+b)~(17a+b) | 001101 |
| 18a~19a | 001101 | (17a+b)~(18a+b) | 011010 |
| 19a~20a | 011010 | (18a+b)~(19a+b) | 110100 |
| 20a~21a | 110100 | (19a+b)~(20a+b) | 101001 |
| 21a~22a | 101001 | (20a+b)~(21a+b) | 010010 |
| 22a~23a | 010010 | (21a+b)~(22a+b) | 100101 |
| 23a~24a | 100101 | (22a+b)~(23a+b) | 001010 |
| 24a~25a | 001010 | (23a+b)~(24a+b) | 010100 |
| 25a~26a | 010100 | (24a+b)~(25a+b) | 101000 |
| 26a~27a | 101000 | (25a+b)~(26a+b) | 010000 |
| 27a~28a | 010000 | (26a+b)~(27a+b) | 100001 |

$a = 360°/28 \approx 12.8°$ $\quad$ $b = 360°/56 \approx 6.4°$

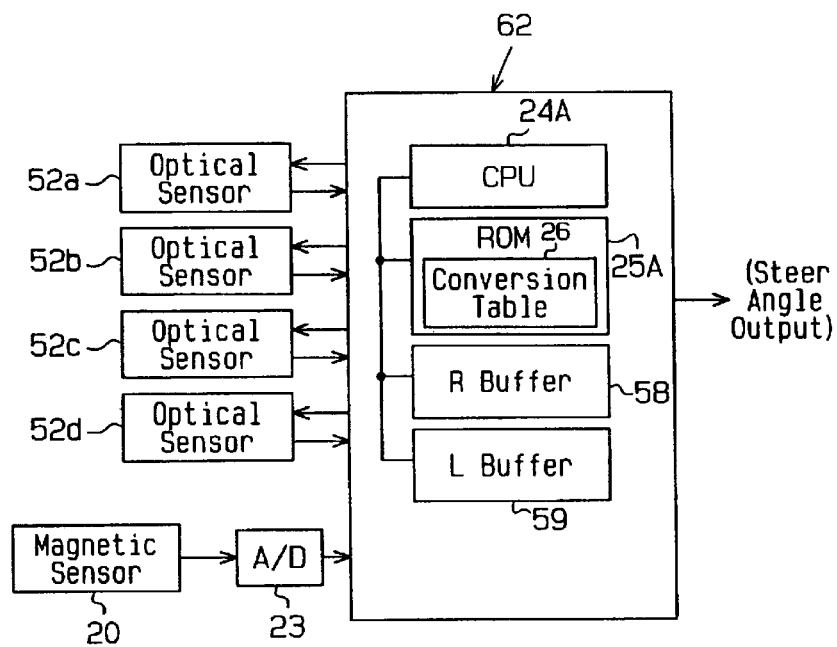

ROTATION ANGLE DETECTOR

TECHNICAL FIELD

The present invention relates to a rotation angle detector for detecting an absolute rotation angle of a rotating body. More specifically, the present invention relates to a rotation angle detector for detecting an absolute steer angle of a steering wheel, for example, in a vehicle.

BACKGROUND ART

The conventional rotation angle detector has an incremental signal encoder for detecting an absolute steer angle (e.g., 720° when steered in the right direction) of a steering wheel that makes multiple rotations. As shown in FIG. 1, an incremental signal encoder 100 includes a rotating plate 40 connected to a steering shaft ST and optical sensor arrays 41 for detecting a slit array (not shown) provided for the rotating plate 40.

When the rotating plate 40 rotates due to steering of the steering wheel, the encoder 100 sequentially detects each slit of the slit array and produces an associated pulse signal that corresponds to each sensed slit. The pulse signal is supplied to an electronic control unit (not shown). The encoder 100 produces an original signal based on a reference slit that is detected when the steer angle is 0° and supplies the original signal to the electronic control unit.

The electronic control unit counts the pulse number of the pulse signals sequentially received based on the steer angle amount of the steering wheel after the original signal is initially received. The electronic control unit detects the absolute steer angle of the steering wheel in accordance with the count value of the pulse number.

However, in the case of detecting the absolute steer angle of the steering wheel with the incremental signal encoder, when the power supply to the electronic control unit is stopped due to switching the ignition switch of the vehicle off, the absolute steer angles calculated up to then are lost. Therefore, when the ignition switch is switched on again and the power supply for the electronic control unit is started, the encoder 100 must be returned to zero again. Therefore, when the ignition switch is switched on again, the steer angle cannot immediately be detected.

Therefore, in the case of detecting the absolute steer angle with the incremental signal encoder, if the power source is still supplied to the electronic control unit after the ignition switch is switched off, the absolute steer angles calculated up to then are maintained. In this case, the power consumption increases since the power source must be supplied to the electronic control unit while the ignition switch is switched off.

To immediately detect the steer angle without increasing power consumption when the ignition switch is switched on again, for example, an absolute signal encoder 200 shown in FIG. 2 may be used for detecting the absolute steer angle.

The absolute signal encoder 200 detects the absolute steer angle of the steering wheel that makes multiple rotations and includes a first encoder 70 connected to a steering shaft ST and a second encoder 71 connected to the first encoder 70.

When the absolute steer angle is detected by only one encoder actuatingly connected so that the encoder makes one complete rotation with respect to the whole steering range of the steering shaft ST, the resolution is degraded. Therefore, the absolute signal encoder 200 includes two encoders 70 and 71.

The first encoder 70 includes a rotating plate 72 connected to the steering shaft ST and the rotating plate 72 includes a gear 73. The first encoder 70 detects in the range of one complete rotation of the steering wheel to obtain the absolute rotation angle of the steering shaft ST. The second encoder 71 includes, for example, a gear 75 fixed to an input shaft 74. The gear 75 meshes with the gear 73 of the rotating plate 72. While the rotating plate 72 makes two complete rotations, the input shaft 74 makes one complete rotation.

The second encoder 71 detects in the range of two complete rotations of the steering wheel to obtain the absolute rotation angle of the steering shaft ST. That is, the first encoder 70 detects the absolute steer angle of the steering wheel through one complete rotation with high resolution. The second encoder 71 detects the absolute steer angle of the steering wheel throughout all of the steering range with lower resolution than that of the first encoder 70. As a result, the absolute steer angle of the steering wheel throughout all steering ranges can be detected with high resolution.

In the encoder 200 including two absolute signal encoders 70, 71, it is not necessary to supply the power source to the electronic control unit while the ignition switch is switched off and the absolute steer angle may be detected with high resolution.

However, when the absolute steer angle is detected by the two encoders 70 and 71, the rotation speed of the input shaft 74 of the second encoder 71 must be reduced to one-half of that of the steering shaft ST. Therefore, the outer diameter of the gear 75, which is fixed to the input shaft 74, is larger than that of the steering shaft ST. This increases the space occupied by the encoder 200 (a rotation angle detector) with respect to the size of the steering shaft ST. As a result, the installation of the rotation angle detector in a vehicle becomes difficult. The difficulty of the installation becomes increasingly pronounced as the rotation range of the steering shaft ST increases.

BRIEF SUMMARY OF THE INVENTION

The objectives of the present invention are to provide a rotation angle detector that detects an absolute rotation angle of a rotating body with high accuracy and allows for reducing the installation space thereof.

To achieve the above objectives, according to the first embodiment of the present invention, a rotation angle detector is provided, which includes a first rotation angle detector connected to a detection body and generates a first detection signal having a cycle corresponding to the rotation of the detection body for detecting the absolute rotation angle of the detection body. The first rotation angle detector, which is connected to the detection body, includes the first rotating body that rotates together with the detection body. The rotation angle detector includes a second rotation angle detector connected to the first rotation angle detector, and the second rotation angle detector includes a second rotating body that rotates together with the first rotating body and has a greater rotation rate than that of the first rotating body. The second rotating body generates a second detection signal having a cycle corresponding to the rotation of the second rotating body based on the rotation of the second rotating body. The rotation angle detector includes a control device, which is connected to the first rotation angle detector and the second rotation angle detector, for detecting the absolute rotation angle of the detection body in accordance with the first and the second detection signals.

In the above arrangement of the first embodiment, since the rotation rate of the second rotating body is greater than that of the first rotating body, the outer diameter of the second rotating body may be reduced compared with that of the first rotating body. This reduces the size of the second rotation angle detector and thus the installation space of the rotation angle detector may also be reduced.

According to the second embodiment of the present invention, a rotation angle detector is provided, which includes a rotating plate connected to the detection body and rotates together with the detection body for detecting the absolute rotation angle of the detection body. The rotating plate includes a plurality of detection holes provided for the periphery of the detection body and non-hole detection parts that are defined between adjacent detection holes. Each of the detection holes includes at least one first detection segment and each of the non-hole detection parts includes at least one second detection segment. The rotation angle detector includes a plurality of detection devices that detect the first and second detection segments based on the rotation of the rotating plate and generates a plurality of binary signals. The rotation angle detector includes a control device that is connected to the plurality of detection devices and generates a code data corresponding to the absolute rotation angle of the detection body in accordance with each of the binary signals. When the detection body rotates by a predetermined rotation angle, the control device changes the code data based on the conversion of at least one of the plurality of binary signals and then determines the absolute rotation angle in accordance with the code data.

In the above arrangement of the second embodiment, the control device generates a code data corresponding to the absolute rotation angle of the detection body in accordance with the first and second detection segments provided for the rotating plate, and determines the absolute rotation angle in accordance with the resultant code data. If the first and the second segments are provided, for example, for a specific annular area of the rotating plate, the outer diameter of the rotating plate does not increase. Therefore, the installation space for the rotation angle detector may be reduced.

According to the third embodiment of the present invention, the rotation angle detector including a rotating plate is provided, which is connected to the detection body and rotates together with the detection body, and detects the absolute rotation angle of the detection body. The rotating plate includes a plurality of first detection parts provided for the periphery of the detection body and a plurality of second detection parts (53b) defined between adjacent first detection parts. Each of the first detection parts includes at least one first detection segment and each of the second detection parts includes at least one second detection segment (SE2). A reference rotation angle is defined based on the first and second detection segments. The rotation angle detector includes a plurality of detection devices that detect the first and second detection segments based on the rotation of the rotating plate and produce a plurality of binary signals. The plurality of devices are set so that the condition in which either one of the first and the second detection parts is detected is switched to the condition in which the other detection part is detected for each rotation of the rotating plate by an amount of the first rotation angle. The first rotation angle is set to a value obtained by dividing the reference rotation angle by a positive integer. The rotation angle detector includes a control device, which is connected to the plurality of detection devices, for generating a code data corresponding to the absolute rotation angle of the detection body in accordance with a binary signal generated by either one of the first and the second detection parts for each rotation of the rotating plate by an amount of the first rotation angle, and for storing the resultant code data. The control device determines an absolute rotation angle in accordance with the code data stored during the rotation of the detection body by a second rotation angle that is set to the predetermined amount obtained by multiplication of the first rotation angle by a positive integer.

BRIEF DESCRIPTION OF THE DRAWINGS

The invention, together with objects and advantages thereof, may best be understood by reference to the following description of the presently preferred embodiments together with the accompanying drawings in which:

FIG. 3A is a schematic cross-sectional view illustrating a rotation angle detector according to the first embodiment of the present invention;

FIG. 3B is a schematic side cross-sectional view illustrating the rotation angle detector according to the first embodiment of the present invention;

FIG. 5 is a graph showing the relationship of outputs of an encoder and a magnetic sensor with respect to the absolute steer angle;

FIG. 6 is an explanatory diagram showing the relationship between the code value LC and the absolute steer angle;

FIG. 11 is an explanatory diagram showing the relationship between the detection area and code data;

FIG. 12 is an explanatory diagram showing the change of the data in each buffer when the rotary shaft rotates in the clockwise direction;

FIG. 13 is an explanatory diagram showing the change of the data in each buffer when the rotary shaft rotates in the counterclockwise direction;

FIGS. 16A–16C are explanatory diagrams explaining the method for writing the code data to the R buffer and the L buffer;

FIG. 17 is an explanatory diagram of data table showing the relationship between the code data of the R buffer and the L buffer and the absolute rotation angle;

FIG. 19 is a schematic block diagram illustrating an electrical circuit of the rotation angle detector shown in FIG. 18; and FIG. 20 is an explanatory diagram of a data table for converting a six-digit code data to a linear code data.

Figure 1:
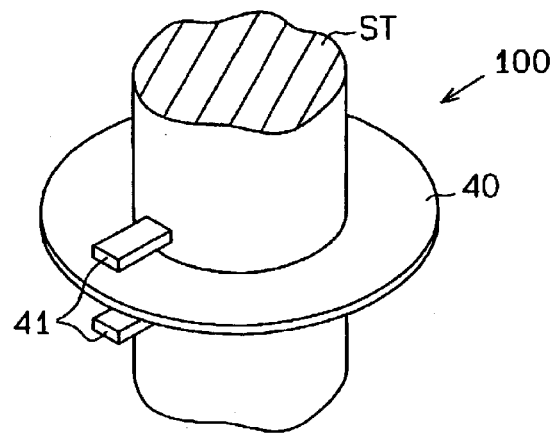
FIG. 1 is a schematic perspective view illustrating a first rotation angle detector according to the prior art.
Figure 2:
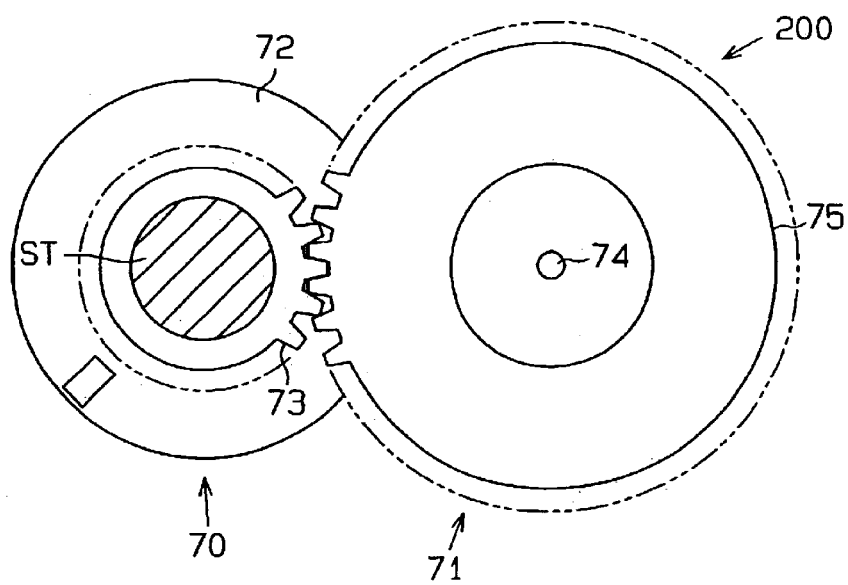
FIG. 2 is a schematic plan view illustrating a second rotation angle detector according to the prior art.

DETAILED DESCRIPTION OF THE INVENTION (First Embodiment)

According to the first embodiment, the rotation angle detector 10 is used as a steer angle detector that detects an absolute steer angle of a steering wheel of a vehicle.

As shown in FIG. 3A and FIG. 3B, the steer angle detector 10 is fixed to a steering shaft (a detection body) ST. The steer angle detector 10 includes a housing 11, an absolute signal encoder (a first rotation angle detector) 15, a magnetic sensor 20, and a circuit board 21. The housing 11 is fixed to a structure surrounding the steering shaft ST. The absolute signal encoder 15, the magnetic sensor 20 (a second rotation angle detector), and the circuit board 21 are accommodated in the housing 11.

The absolute signal encoder (hereafter referred to as "encoder") 15 includes a rotary shaft 12, a rotating plate (a first rotating body) 13, and an optical sensor array 14. The rotary shaft 12 is rotatably supported by the housing 11. The rotary shaft 12 is fixed to the steering shaft ST with the rotary shaft 12 being fitted onto the steering shaft ST and rotates together with the steering shaft ST. A first gear 12a is provided for the outer periphery of the rotary shaft 12.

The rotating plate 13 is supported on the outer periphery of the rotary shaft 12 and rotates together with the rotary shaft 12. The rotating plate 13 includes a plurality of annular slit arrays 13a for detecting an absolute rotation angle of the rotating plate 13 (an absolute steer angle of the steering wheel) each provided for an associated circumference about an axis thereof. Absolute signal code such as binary code and grey code is generated in accordance with the plurality of annular slit arrays 13a.

The optical sensor array 14 generates a code signal (a first detection signal) SC based on the plurality of annular slit arrays 13a. The optical sensor array 14 includes a plurality of optical sensors 14a (three sensors in the first embodiment). Each of the optical sensors 14a is well known and includes, for example, an LED and a photodiode.

The magnetic sensor 20, which is an analog signal rotation angle sensor, includes a second gear (a second rotating body) 16, a permanent magnet 17, and a circuit board 18. The second gear 16 meshes with the first gear 12a of the rotary shaft 12. The second gear 16 rotates 1.75 times rotation for every one complete rotation of the rotary shaft 12.

The permanent magnet 17 is fixed to the center of the second gear 16. The permanent magnet 17 generates magnetic flux in the radial direction of the second gear 16. Therefore, when the second gear 16 makes one complete rotation, the direction of the magnetic flux generated by the permanent magnet 17 is changed by 360°.

The circuit board 18 is fixed to a position opposing the second gear 16. The circuit board 18 is provided with a magnetic resistive element 19, which is opposed to the permanent magnet 17. The magnetic resistive element 19, which is a differential output type, detects the magnetic flux generated by the permanent magnet 17 and generates a voltage signal (a second detection signal) SV corresponding to the rotation angle of the second gear 16 in accordance with the detected flux. The circuit board 18 includes an amplifier (not shown) for amplifying the voltage signal SV.

Figure 4:
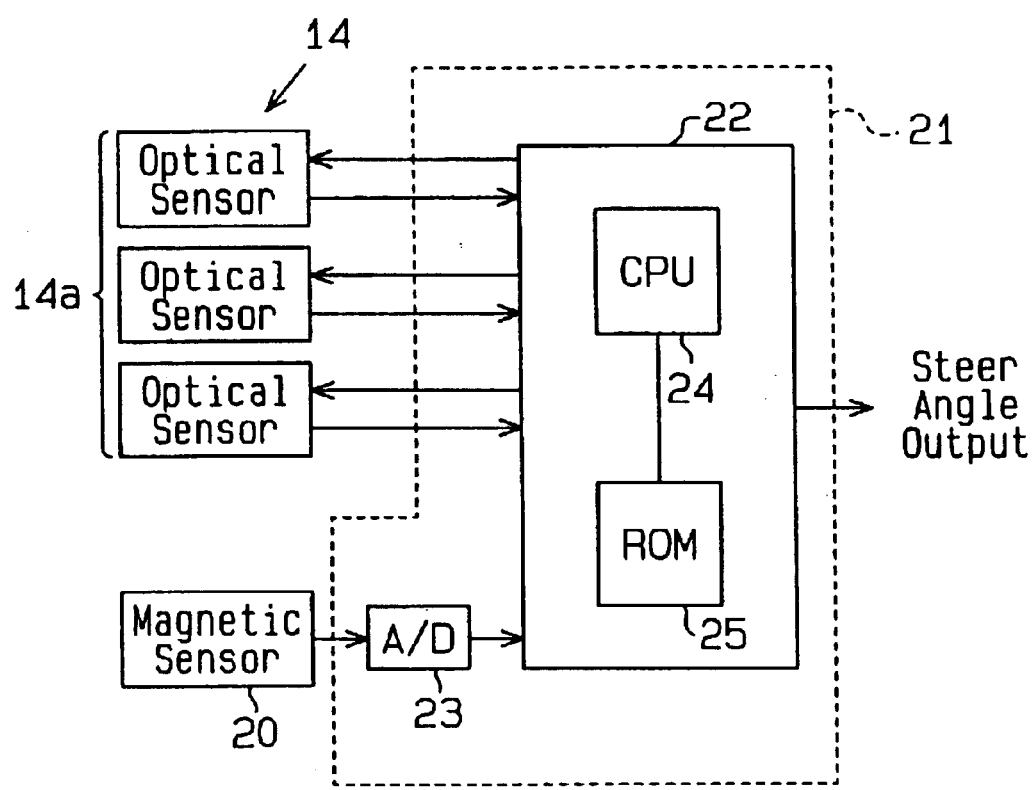
FIG. 4 is a schematic block diagram illustrating an electrical circuit of the rotation angle detector shown in FIG. 3A.

As shown in FIG. 4, a circuit board 21 includes a microcomputer 22 (hereafter referred to as "computer") for detecting the absolute rotation angle and an A/D converter 23.

The computer 22 includes a CPU 24 and a ROM 25. The computer 22 is connected to each optical sensor 14a of the optical sensor array 14 and is also connected to the magnetic sensor 20 through the A/D converter 23. The computer 22 receives a code signal SC of the optical sensor array 14 and a digital voltage signal SV of the magnetic sensor 20 output from the A/D converter 23. The computer 22 can work only when the ignition switch of the vehicle is switched on.

The CPU 24 executes a control program stored in the ROM 25. The CPU 24 receives a code value LC of a code signal SC and a voltage value LV of a voltage signal SV in accordance with the execution of the control program. The CPU 24 detects the absolute rotation angle of the rotary shaft 12 (the absolute steer angle of the steering shaft ST) in accordance with the code value LC and the voltage value LV and outputs the detected absolute steer angle.

In the first embodiment, the detection range of the absolute steer angle of the steering wheel is from an absolute steer angle of 0° that is in the condition in which the vehicle goes straight to the absolute steer angle of 720° that is in the condition in which the wheel is turned to the right by two complete rotations, and is from an absolute steer angle of 0° to the absolute steer angle of −720° that is in the condition in which the wheel is turned to the left by two complete rotations. Here, the absolute steer angles of 720° and −720° are not included in the detection range. In this specification, as a matter of convenience for explanation, the absolute steer angle when the steering wheel is turned to right is expressed as a positive value, while the absolute steer angle when the steering wheel is turned to left is expressed as a negative value.

The operation of the steer angle detector 10 will now be explained.

FIG. 5 is a graph showing the relationship of the code signal SC of the encoder 15 and the voltage signal SV of the magnetic sensor 20 with respect to the absolute steer angle. As shown in FIG. 5, when the steering wheel is turned to the right from the straight-line driving position of the vehicle, the value of the code signal (the code value) LC monotonously increases from C0 to C max in the ranges of the absolute steer angle from 0° to 360° and the absolute steer angle from 360° to 720°.

On the other hand, when the steering wheel is turned to the left from the straight-line driving position of the vehicle, the code value LC monotonously decreases from C max to C0 in the ranges of the absolute steer angle from 0° to −360° and the absolute steer angle from −360° to −720°.

When the steering wheel is turned to the right from the straight-line driving position of the vehicle, the magnetic sensor 20 produces a voltage signal SV that changes according to a sinusoidal waveform and supplies the resultant voltage signal SV to the computer 22. One cycle of the voltage signal SV is set to the range from the absolute steer angle of 0° to 205.6° (i.e., 360°/1.75). Therefore, the voltage signal SV completes 1.75 cycles in the range of the steer angle of the absolute steer angle from 0° to 360°.

As shown in FIG. 5, when the steering wheel is turned to the left from the straight-line driving position of the vehicle, the magnetic sensor 20 produces a voltage signal SV, which changes according to a sinusoidal waveform, having the same cycle as in the case of a right turn and supplies the resultant voltage signal SV to the computer 22.

The CPU 24 detects the absolute steer angle using the data table stored on the ROM 25. As shown in FIG. 6, the data table stores the code value LC and the voltage value LV corresponding to the code value LC with these values being in relation to the absolute steer angle.

The data table shown in FIG. 6 indicates only data relating to a plurality of specific code values C1 to C13. In the specific code values C1 to C13, the absolute steer angle is not determined by the combination of the code value LC and the voltage value LV. Therefore, FIG. 6 also shows the change of the voltage value LV based on the increase or the decrease of the voltage value LV and the code value LC with respect to the plurality of the specific code values C1 to C13. In FIG. 6, the increase of the voltage value LV (i.e., when the voltage gradient is positive) is indicated as "+" and the decrease of the voltage value LV (i.e., when the voltage gradient is negative) is indicated as "−". The code value LC in which the absolute steer angle is determined by the combination with the voltage value LV is stored in the data table separately.

More specifically, in the data table shown in FIG. 6, when the code value LC increases based on steering of the steering wheel and thus is set to the specific code values C1 to C13, the information regarding either one of the increase and the decrease of the voltage value LV is stored. Similarly, when the code value LC decreases and thus is set to the specific code values C1 to C13, the information regarding either one of the increase and the decrease of the voltage value LV is stored. The reason why the information regarding the change of voltage value LV is stored will now be explained.

As shown in FIG. 5, the code signal SC of the encoder 15 repeats the monotonously increasing change every 360°-cycle of the relative steer angle. On the other hand, the voltage value LV changes in the sinusoidal waveform every 205.6°-cycle of the relative steer angle. Therefore, a plurality of points where the combination between the code value LC and the voltage value LV coincides exist regardless of the value of the absolute steer angle being different.

For example, as shown in FIG. 6, in the range of steer angles between the absolute steer angles of 0° to 360°, the absolute steer angle value 102.80° (25.7°·4), 205.6° (25.7°·8), or 308.4° (25.7°·12) when the voltage value LV is equal to 0 has the associated code value C4, C8, or C12, respectively.

On the other hand, in the range of steer angles between the absolute steer angles of −720° to −360°, the absolute steer angle value (−720+102.8)°, (−720+205.6)°, or (−720+308.4)° when the voltage value LV is equal to 0 has the associated code value C4, C8, or C12, respectively. Therefore, as shown in FIG. 5, the absolute steer angle at point A is 102.8° and the absolute steer angle at point B is (−720+102.8)°, and the voltage value LV at both points is identical, i.e., 0, and the code value at both points A and B is identical, i.e., C4.

In the range of steer angles between the absolute steer angles of 360° to 720°, the absolute steer angle value (360+51.4)° (25.7°·2), (360+154.2)° (25.7°·6), or (360+257.0)° (25.7°·10) when the voltage values LV is equal to 0 has the associated code value C2, C6, or C10, respectively.

On the other hand, in the range of steer angles between the absolute steer angles of −360° to 0°, the absolute steer angle value (−360+51.4)°, (−360+154.2)°, or (−360+257.0)° when the voltage values LV is equal to 0 has the associated code value C2, C6, or C10, respectively.

In the range of steer angles between absolute steer angles of 0° to 360°, each of the absolute steer angles 25.7° and 231.3° (25.70°·9) when the voltage value LV is equal to V1, has the associated code values C1 and C9, respectively. On the other hand, in the range of steer angles between absolute steer angles of −360° to 0°, each of the absolute steer angles (−360+25.7)° and (−360+231.3)° when the voltage value LV is equal to V1, has the associated code values C1 and C9, respectively. Therefore, as shown in FIG. 5, the absolute steer angle at point C is 25.7° and the absolute steer angle at point D is (−360+25.7)°, and the voltage value LV at both points is identical, i.e., V1 and the code value at both points C and D is identical, i.e., C1.

Each of the absolute steer angles 128.5° (25.7°·5) and 334.1° (25.7°·13) when the voltage value LV is equal to −V1, has the associated code values C5 and C13, respectively. Each of the absolute steer angles (−720+128.5)° and (−720+334.1)° when the voltage value LV is equal to −V1, has the associated code values C5 and C13, respectively.

In the range of steer angles between the absolute steer angles of 0° to 360°, each of the absolute steer angle values 77.1° (25.7°·3) and 282.7° (25.7°·11) when the voltage value LV is equal to V1 has the associated code value C3 or C11, respectively. On the other hand, in the range of steer angles between the absolute steer angles of 360° to 720°, each of the absolute steer angle values (360+77.1)° and (360+282.7)° when the voltage value LV is equal to V1 has the associated code value C3 or C11, respectively. Similarly, the absolute steer angle 179.9° (25.7°·7) when the voltage value LV is equal to −V1 has the associated code value C7, while the absolute steer angle (360+179.9)° when the voltage value LV is equal to −V1 has the associated code value C7.

As shown above, in the range of steer angles between the absolute steer angles of −720° to 720°, which is the detectable range, a plurality of absolute steer angles exist that have the same combination of the code value LC and the voltage value LV.

However, even when the combination of the code value LC and the voltage value LV is identical, the combination of the change of the code value LC and the change of the voltage value LV is different. That is, for two absolute steer angles that have the same combination of the code value LC and the voltage value LV, when the code value LC increases to be set to the specific code value, the voltage value LV of one absolute steer angle decreases, while the voltage value LV of the other absolute steer angle increases.

For example, when the steer angles are 102.8° and (−720+102.8)°, both code values are C4 and both voltage values are 0. However, for the steer angle of 102.8°, the code value LC increases to be set to C4 and the voltage value LV decreases to be set to 0. On the other hand, for the steer angle of (−720+102.8)°, the code value LC increases to be set C4 and the voltage value LC increases to be set to 0.

Accordingly, in the first embodiment, when the code value LC with respect to the absolute steer angle to be detected is set to the specific value such as C1, C2 . . . C13, the actual absolute steer angle is determined by comparison of the voltage ingredient of the voltage value LV with respect to the change of the code value LC. Therefore, the data table stores data showing the change of the voltage value LV associated with the code value LC corresponding to each absolute steer angle.

The CPU 24 detects the absolute steer angle using the data table in the following ways. (When the code value LC is neither of the specific code values C1–C13)

The CPU 24 receives a code signal SC of the encoder 15 and a voltage signal SV of the magnetic sensor 20 based on the actual absolute steer angle of the steering wheel. When the value of the code signal LC is neither one of the specific code values C1 to C13, the CPU 24 compares the combination of the received code value LC and the received voltage value LV of the magnetic sensor with each data combination of the code value LC and the voltage value LV in the data table.

The CPU 24 determines the absolute steer angle corresponding to the matched data combination of the code value LC and the voltage value LV as a detected value. In such a case, the absolute steer angle can be detected even immediately after the ignition switch of the vehicle is switched on and the computer 22 is activated or even when the steering wheel is not steered.

(When the Code Value LC is Either of the Specific Code Values C1–C13)

The CPU 24 does not perform the detection of the absolute steer angle when a code value LC initially received after the computer 22 being started up is either one of the code values C1–C13. This is because the CPU 24 cannot determine the change of the code value LC and also the change of the voltage value LV relating to the change of the code value LC.

Therefore, when the computer 22 is started up, the detected code value LC is either one of the specific code values C1–C13 and the steering wheel is not being steered, the absolute steer angle is not detected.

Subsequently, when the steering wheel is steered and the detected code value LC is neither one of the specific code values C1–C13, the CPU 24 freshly receives a code value LC and a voltage value LV. When the combination of the code value LC and the voltage value LC that have been freshly received matches with either one of the data stored in the data table, the absolute steer angle may be detected. Therefore, even when the computer 22 is started up and the detected code value LC is either one of the specific code values C1–C13, the absolute steer angle can be detected as long as the steering wheel is steered.

Next, in the case of a finally detected code value LC being either one of the specific code values C1–C13 due to the stoppage of steering of the steering wheel, the absolute steer angle is detected as follows.

The CPU 24 assumes the detected absolute steer angle, based on the combination of the code value LC and the voltage value LV that have been detected just before the finally detected specific value, as being the actual absolute steer value. The CPU 24 determines whether the change of the voltage value LV with respect to the change of the code value LC corresponding to the assumed absolute steer angle matches the actual change of the voltage value LV.

When the change of the voltage value LV with respect to the change of the code value LC matches the actual change of the voltage value LV, the CPU 24 outputs the assumed absolute steer angle as the detected value. On the contrary, when the change of the voltage value LV with respect to the change of the code values LC does not match the actual change of the voltage value LV, the CPU 24 outputs the absolute steer angle corresponding to another data combination of the code value LC and the voltage value LV that matches the combination of the code value LC and the voltage value LV that have finally been detected and thus outputs as the actual detected value.

Therefore, when steering of the steering wheel is stopped, the final absolute steer angle is detected even though a plurality of specific absolute steer angles are assumed as the final absolute steer angle.

The steer angle detector 10 of the first embodiment has the following advantages.

(1) The computer 22 collates the combination of the code value LC generated from the encoder 15 and the voltage value LV generated from the magnetic sensor 20, which are based on the absolute steer angle of the steering wheel, with the data table and then obtains the absolute steer angle. The gear 16 that rotates more than the number of revolutions of the encoder 15 has the smaller outer diameter relative to the gear 12a of the rotary shaft 12. This reduces the installation space required around the steering shaft ST. As a result, the steer angle detector 10 is easily assembled inside of the vehicle having the steering shaft ST.

(2) Since the encoder 15 is an absolute signal encoder, the detection value of the absolute rotation angle is produced as a code value. This supplies the detection value of the encoder 15 to the computer 22 without A/D conversion of the detection value.

(3) The magnetic sensor 20 is an analog signal type rotation angle sensor and produces a sinusoidal voltage signal VS in accordance with the detected value of the magnetic resistive element 19. The computer 22 determines the absolute steer angle based on the voltage gradient of the voltage signal SV in addition to the combination of the code value LC of the encoder 15 and the voltage value LV of the voltage signal SV. Therefore, the space occupied by the steer angle detector 10 with respect to the space surrounding the steering shaft ST is further reduced compared with the case when the encoder 15 and another encoder are installed.

(Second Embodiment)

Figure 9:
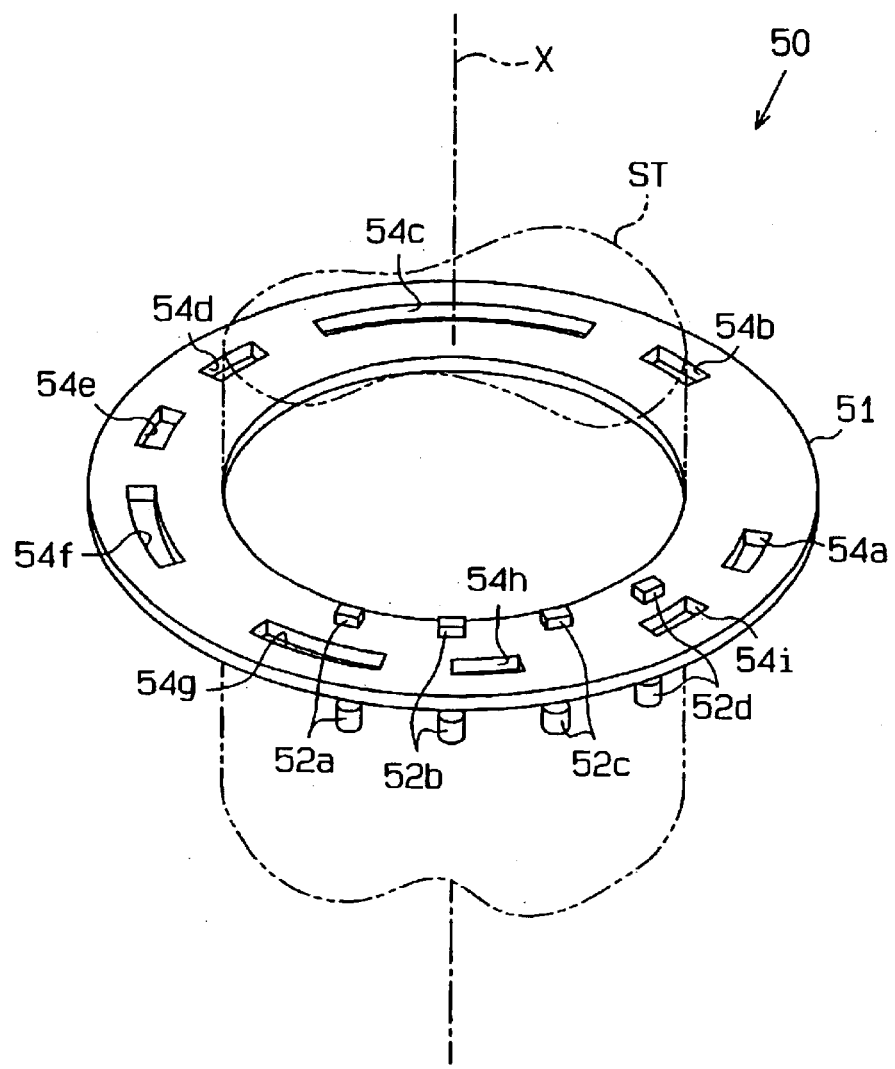
FIG. 9 is a schematic perspective view illustrating a rotation angle detector according to the second embodiment of the present invention.

FIG. 9 is a schematic perspective view of a rotation angle detector 50 of the second embodiment according to the present invention. As shown in FIG. 9, the rotation angle detector 50 includes a rotating plate 51 and four optical sensors 52a, 52b, 52c, and 52d that are provided opposed to both surfaces of the rotating plate 51.

The rotating plate 51 is fixed to a rotary shaft (e.g., a steering shaft in which the absolute steer angle is detected) ST with the rotating plate 51 being fitted onto the rotary shaft ST. When the rotary shaft ST rotates, the rotating plate 51 rotates together with the rotary shaft ST about the axis X of the rotary shaft ST.

Each of optical sensors 52a–52d is fixed to a support (not shown) of the rotary shaft ST. In the second embodiment, the optical sensors 52a and 52c function as a first detection device and the optical sensors 52b and 52d function as a second detection device.

Figure 10:
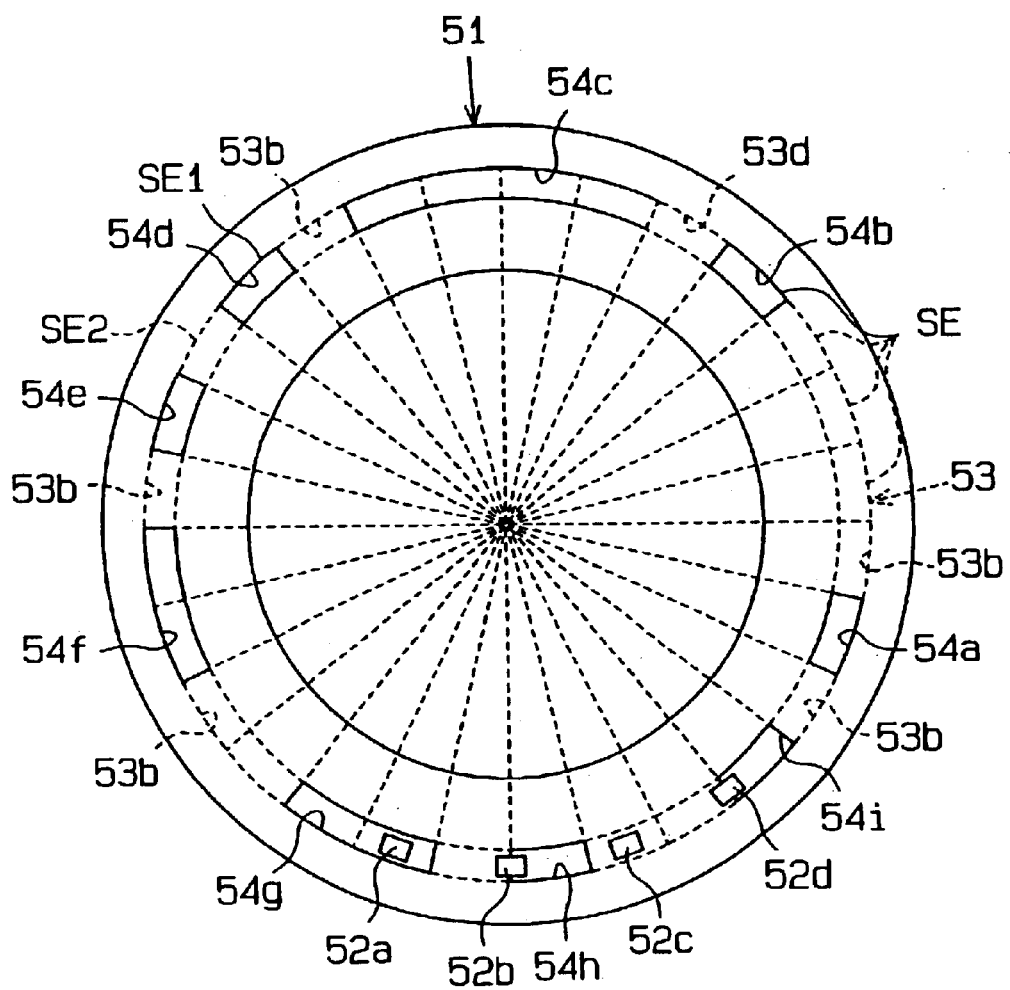
FIG. 10 is a plan view illustrating a rotating plate of the rotation angle detector shown in FIG. 9.

As shown in FIG. 10, the rotating plate 51 includes an annular detection area 53 having a predetermined width in the radial direction along a circumference about an axis X. The detection area 53 is divided into twenty-eight detection segments SE. Each detection segment SE is equiangularly ($360°/28=12.8°$) arranged about the axis X.

The detection area 53 includes eight detection holes 54a–54i arranged in order counterclockwise. Each of the detection holes 54a–54i includes at least one successive first detection segment SE1. More specifically, each of the detection holes 54a, 54b, 54d, 54e, 54h, and 54i include one first detection segment SE1 and each of the detection holes 54f and 54g includes two successive first detection segments SE1, and the detection hole 54c includes four successive detection segments SE1.

Each of non-hole parts 53b having at least one successive second detection segment SE2 are provided between the adjacent detection holes 54a–54i, respectively. More specifically, a non-hole part 53b provided between the detection holes 54a and 54b includes four successive second detection segments SE2. Each of the non-hole parts 53b provided between associated detection holes 54b and 54c, 54c and 54d, 54d and 54e, 54e and 54f, 54g and 54h, and 54i and 54a includes one second detection segment SE2, respectively. Each of the non-hole parts 53b provided between the associated detection holes 54f and 54g, and 54h and 54i include two successive second detection segments SE2, respectively.

Figure 11:
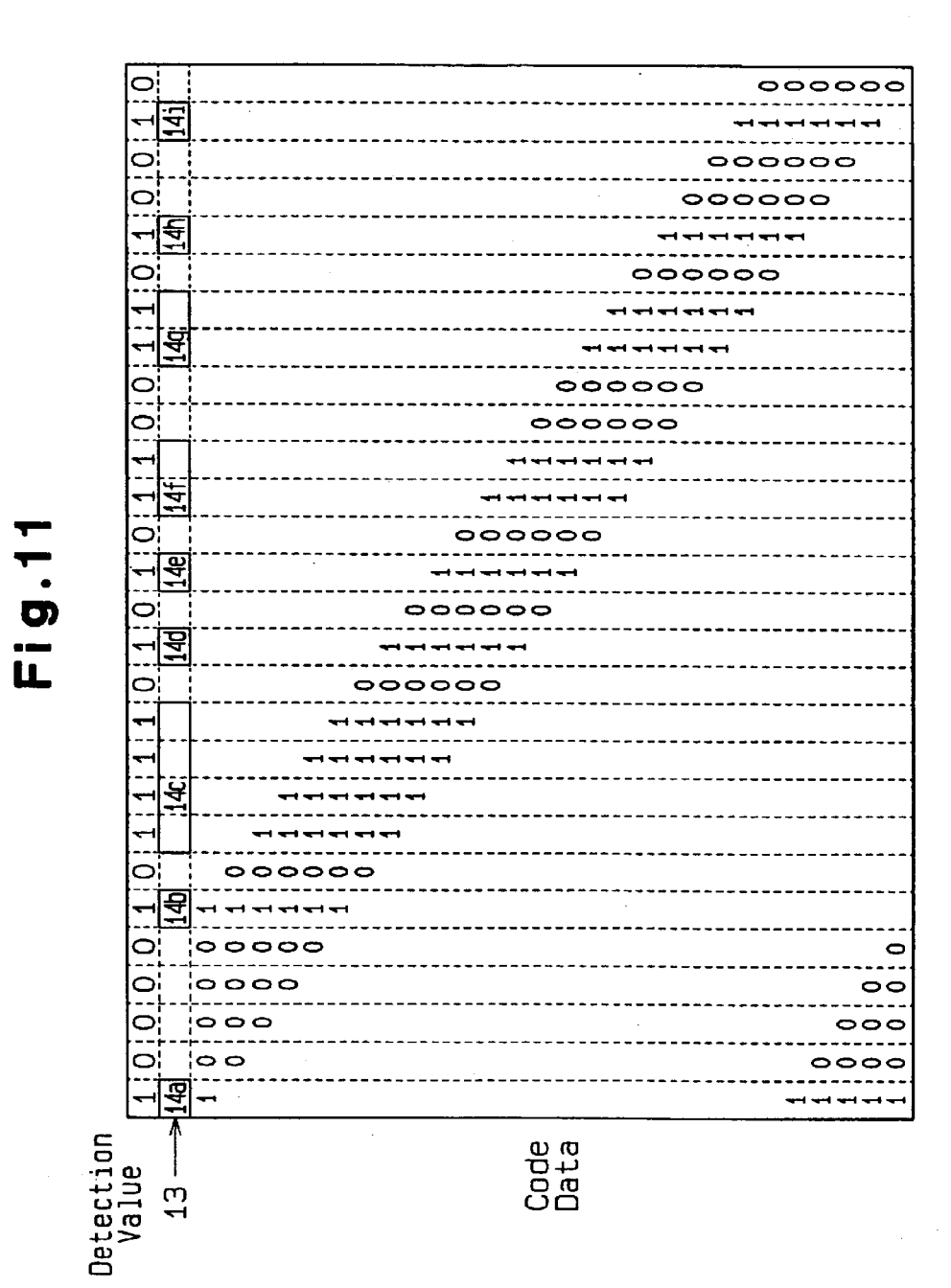

In the second embodiment, the code data is detected in accordance with each of the detection segment SE. As shown in FIG. 11, for example, a 6-bit code data is detected in accordance with the six successive detection segments SE. The code data 1 is detected from the first detection segment SE1 and the code data 0 is detected from the second detection segment SE2.

Counterclockwise code data 100001 is generated by the detection hole 54a, the non-hole part 53b having four successive second detection segments SE2, and the detection hole 54b. Next, counterclockwise code data 000010 is generated by the six successive detection segments SE starting from the non-hole part 54b adjacent to the detection hole 54a.

In the detection area 53, each of the detection holes 54a–54i is arranged so that each of 6-digit code data produced, in accordance with the counterclockwise six successive detection segments SE, is different from each other.

Each of the optical sensors 52a–52d is arranged along the detection area 53. The optical sensors 52a–52d are well known and include items such as a light-emitting diode and a photo transistor. As shown in FIG. 10, each of the optical sensors 52a–52d is arranged in the counterclockwise direction with each sensor being apart from the adjacent sensor by the angle that corresponds to one and one-half times the detection segment SE (19.2°).

As shown in FIGS. 12 and 13, when the optical sensor 52a detects a center part of one detection segment SE, the optical sensor 52c detects a center part of the third detection segment SE from the detection segment SE of the sensor 52a in the counterclockwise direction. In this state, the optical sensor 52b detects a boundary area between the first and the second detection segments SE from the detection segment SE of the sensor 52a in the counterclockwise direction. The optical sensor 52d detects a boundary area between the fourth and fifth detection segments SE from the detection segment SE of the sensor 52a in the counterclockwise direction.

On the other hand, when the optical sensor 52b detects a center part of one detection segment SE, the optical sensor 52d detects a center part of the third detection segment SE from the detection segment SE of the sensor 52b in the counterclockwise direction. In this state, the optical sensor 52a detects a boundary area between the first and the second detection segments SE from the detection segment SE of the sensor 52b in the clockwise direction. The optical sensor 52c detects a boundary area between the fourth and fifth detection segments SE from the detection segment SE of the sensor 52a in the counterclockwise direction.

The electrical arrangement of the rotation angle detector 50 will now be explained.

Figure 14:
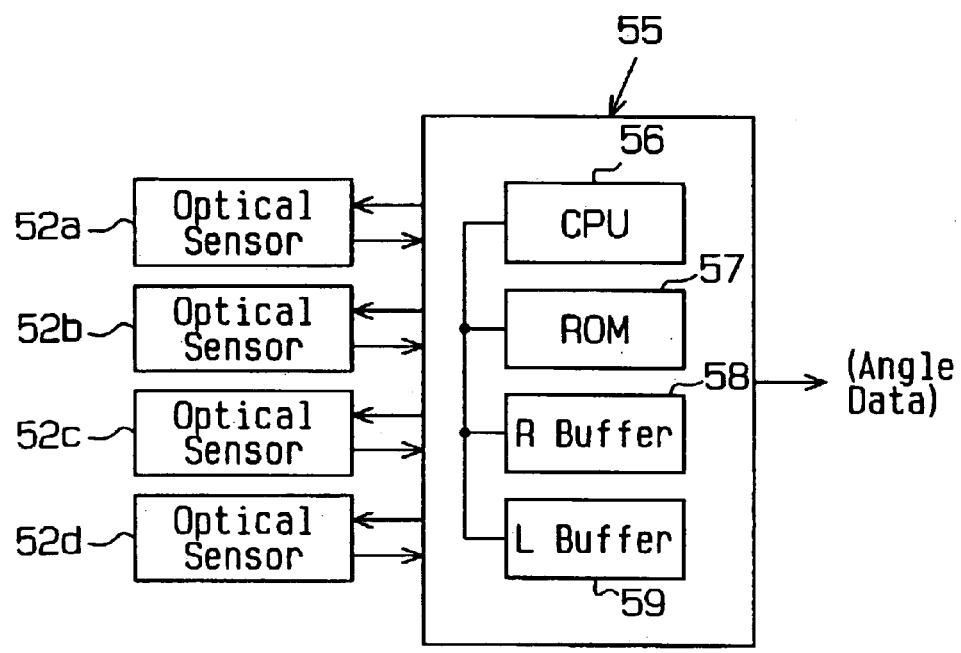
FIG. 14 is a schematic block diagram illustrating an electrical circuit of the rotation angle detector shown in FIG. 9.

As shown in FIG. 14, the rotation angle detector 50 includes a microcomputer 55 (hereafter referred to as a "computer"). The computer 55 includes a CPU 56, a ROM 57, an R buffer 58, and an L buffer 59.

Each of the optical sensors 52a–52d is connected to the computer 55. When the rotating plate 51 rotates in the clockwise or the counterclockwise direction, each optical sensor 52a–54d successively detects each detection segment SE based on the rotation direction of the rotating plate 51, produces a binary voltage signal based on the detection segment SE, and supplies the resultant voltage signal to the computer 55. That is, each of optical sensors 52a–52d generates a high potential voltage signal (1) when the detection segment SE of the detection holes 54a–54i is detected, while generates a low potential voltage signal (0) when the detection segment SE of the non-hole parts 53b is detected.

When the rotating plate 51 rotates in the clockwise or the counterclockwise direction, the CPU 56 receives a signal detected from each of the optical sensors 52a–52d in accordance with the control program stored on the ROM 57.

When the rotating plate 51 rotates in the clockwise or the counterclockwise direction by the angle that corresponds to one and one-half times the detection segment SE (19.2°), the CPU 56 receives a 6-bit code data composed of detection values 1 and 0. The CPU 56 stores the 6-bit code data on the R buffer 58 and the L buffer 59.

The way in which the CPU 56 receives code data produced in the detection area 53 through each of the optical sensors 52a–52d when the rotating plate 51 rotates will now be explained in detail.

When one of the detection values of the optical sensors 52a and 52c is changed, the CPU 56 stores each of the detection values of the optical sensors 52b and 52d on the R buffer 58 and the L buffer 59. On the other hand, when one of the detection values of the optical sensors 52b and 52d is changed, the CPU 56 stores each of the detection values of the optical sensors 52a and 52c on the R buffer 58 and the L buffer 59.

Figure 15A:
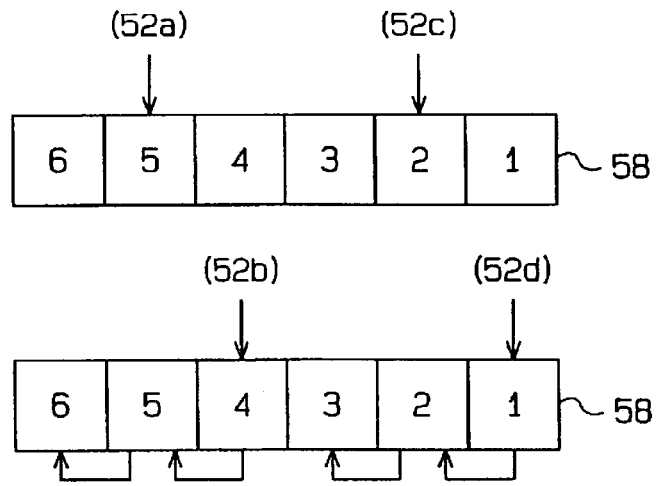
FIG. 15A is an explanatory diagram explaining writing of the detection value to the R buffer of the electrical circuit shown in FIG. 14.
Figure 15B:
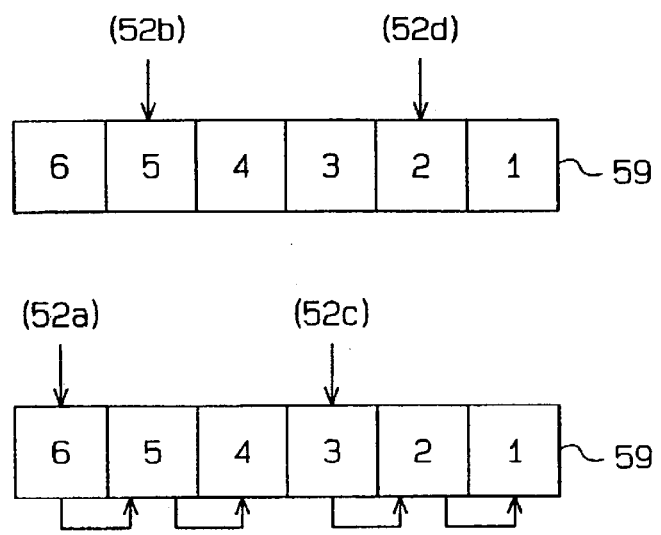
FIG. 15B is an explanatory diagram explaining writing of the detection value to the L buffer of the electrical circuit shown in FIG. 14.

The aspect of storing the detection values to each of the buffers 58 and 59 will now be concretely explained. FIG. 15A shows the aspect of storing the detection values to the R buffer 58, while FIG. 15B shows the aspect of storing the detection values to the L buffer 59.

The storing of the detection values to the R buffer 58 is carried out as follows. As shown in FIG. 15A, the CPU 56 stores the detection value of the optical sensor 52a in the fifth digit of the R buffer 58 and the detection value of the optical sensor 52c in the second digit of the R buffer 58 when one of the optical sensors 52b and 52d is changed. On the other hand, the CPU 56 stores the detection value of the optical sensor 52b in the fourth digit of the R buffer 58 and the detection value of the optical sensor 52d in the first digit of the R buffer 58 when one of the optical sensors 52a and 52c is changed. At this time, the CPU 56 transfers the detection value stored in the original fourth digit to the fifth digit, the original fifth digit to the sixth digit, the original first digit to the second digit, and the original second digit to the third digit.

The storing of the detection values to the L buffer 59 is carried out as follows. As shown in FIG. 15B, the CPU 56 stores the detection value of the optical sensor 52b in the fifth digit of the L buffer 59 and the detection value of the optical sensor 52c in the second digit of the L buffer 59 when one of the optical sensors 52a and 52c is changed. On the other hand, the CPU 56 stores the detection value of the optical sensor 52a in the sixth digit of the L buffer 59 and the detection value of the optical sensor 52c in the third digit of the L buffer 59 when one of the optical sensors 52b and 52d is changed. At this time, the CPU 56 transfers the detection value stored in the original sixth digit of the L buffer 59 to the fifth digit, the original fifth digit to the fourth digit, the original third digit to the second digit, and the original second digit to the first digit.

Through this treatment, as shown in FIGS. 16A to 16C, the CPU 56 stores one of the twenty-eight code data formed at the detection area 53 on the R buffer 58 during the clockwise rotation of the rotating plate 51 by the angle that corresponds to one and one-half times the detection segment SE (19.2°). On the other hand, the CPT 56 stores one of the twenty-eight code data formed at the detection area 53 on the L buffer 59 during the counterclockwise rotation of the rotating plate 51 by the angle that corresponds to the one and one-half times the detection segment SE (19.2°). That is, the CPU 56 stores code data that corresponds to the absolute rotation angle of the rotating plate 51 on either the R buffer 58 or the L buffer 59 from the twenty-eight code data, each of which is obtained by the angle corresponding to one detection segment SE as a reference resolution (360/28°= about 12.9°).

In the second embodiment, the code data formed in the L buffer 59 during the clockwise rotation of the rotating plate 51 has code data that corresponds to one of the twenty-eight detection code data formed at the detection area 53. (See, for example, "001101" of FIG. 12.) It is preferable that the code data formed in the L buffer 59 does not correspond to one of the detection code data. However, it happens that both data coincide to each other due to the number and the location of the detection holes 54a–54i at the detection area 53 and the location of the optical sensors 52a–52d.

As shown in FIG. 17, the ROM 57 stores a data table in which each of the twenty-eight code data corresponds to an absolute rotation angle of the rotating plate 51. The data table stores a plurality of code data, each of which corresponds to an absolute rotation angle of the rotating plate 51, on each of the buffers 58 and 59. The absolute rotation angle of the rotating plate 51 is divided in accordance with the reference resolution (angle) of about 12.9°.

When the rotary shaft ST rotates, the CPU 56 compares the code data stored on the R buffer 58 with the R buffer code data of the data table, and the code data stored on the L buffer 59 with the L buffer code data of the data table.

If the code data stored on the L buffer 59 matches none of the L buffer code data and the code data stored on the R buffer 58 matches one of the R buffer code data, the CPU 56 determines that the rotating plate 51 has rotated in the clockwise direction by the absolute rotation angle corresponding to the code data.

On the other hand, if the code data stored on the R buffer 58 matches none of the R buffer code data and the code data stored on the L buffer 59 matches one of the L buffer code data, the CPU 56 determines that the rotating plate 51 rotates in the counterclockwise direction by the absolute rotation angle corresponding to the code data.

If the code data stored on the R buffer 58 matches one of the R buffer code data and the code data stored on the L buffer 59 matches one of the L buffer code data, the CPU 56 does not determine the absolute rotation angle. This is because the CPU 56 does not determine whether the rotating plate 51 rotates in the clockwise direction or the counterclockwise direction.

If the code data stored on the R buffer 58 or the L buffer 59 when the rotating plate 51 rotates in the clockwise direction is the same as the code data stored on the R buffer or the L buffer 59 when the rotating plate 51 rotates in the counterclockwise direction, the absolute rotation angles of the rotating plate 51 in both cases are different (see FIG. 17).

The CPU 56 detects the absolute rotation angle of the rotating plate 51 in accordance with the code data stored on the R buffer 58 or the L buffer 59. After such detection, the CPU 56 detects a new absolute rotation angle in accordance with the change of one of the detection values of the optical sensors 52a and 52c, or change of the detection values of the optical sensors 52b and 52d.

More specifically, when the CPU 56 detects an absolute rotation angle in the clockwise direction in accordance with the code data stored on the R buffer 58, a new absolute rotation angle will be detected as follows.

When one of the detection values of the optical sensors 52b and 52d is changed after detection of the absolute rotation angle in accordance with change of the detection values of the optical sensors 52a and 52c, the CPU 56 determines that the rotating plate 51 has rotated further in the same clockwise direction by an angle 6.4°, which corresponds to one-half of detection segment SE. When one of the detection values of the optical sensors 52a and 52c is changed after the detection of the absolute rotation angle in accordance with change of the detection values of the optical sensors 52a and 52c, the CPU 56 determines that the rotation of the rotating plate 51 in the clockwise direction has stopped. Subsequently, when one of the detection values of the optical sensors 52b and 52d is changed, the CPU 56 determines that the rotating plate 51 rotated in the counterclockwise direction by an angle of 6.4°.

On the other hand, when one of the detection values of the optical sensors 52a and 52c is changed after the detection of the absolute rotation angle in accordance with change of the detection values of the optical sensors 52b and 52d, the CPU 56 determines that the rotating plate 51 rotated further in the same clockwise direction by an angle of 6.4°, which corresponds to one-half of detection segment SE. When one of the detection values of the optical sensors 52b and 52d is changed after the detection of the absolute rotation angle in accordance with change of the detection values of the optical sensors 52b and 52d, the CPU 56 determines that rotation of the rotating plate 51 in the clockwise direction has stopped. Subsequently, when one of the detection values of the optical sensors 52a and 52c is changed, the CPU 56 determines that the rotating plate 51 has rotated in the counterclockwise direction by an angle of 6.4°.

Similarly, the CPU 56 detects a new absolute rotation angle when the rotating plate 51 rotates in the counterclockwise direction in accordance with the code data stored on the L buffer 59.

Accordingly, the CPU 56 actually detects the absolute rotation angle of the rotating plate 51 in accordance with the maximum resolution of one-half of the angle that corresponds to the detection segment SE (360°/56=about 6.4°).

When the code data stored on the L buffer 59 is one of the twenty-eight code data and is one stored during the clockwise rotation of the rotating plate 51, the CPU 56 determines the rotating direction and the absolute rotation angle of the rotating plate 51 in accordance with the code data that is newly stored on the R buffer 58 or the L buffer 59 based on the rotation of the rotating plate 51.

Once detecting the rotating direction and the absolute rotation angle of the rotating plate 51, the CPU 56 detects a new absolute rotation angle in accordance with one of the changes of the detection values of the optical sensors 52a and 52c or one of the changes of the detection values of the optical sensors 52b and 52d.

In addition, when the absolute rotation angle is detected in accordance with one of the changes of the optical sensors 52a, 52c, 52b, and 52d, the CPU 56 compares the code data stored on the R buffer 58 or the L buffer 59 with the code data of the data table, if necessary. The CPU 56 seeks the code data that matches the code data stored on the R buffer 58 or the L buffer 59 from the code data of the data table.

When the code data stored on the R buffer 58 matches one of the R buffer code data of the data table, the CPU 56 seeks an absolute rotation angle corresponding to the matched code data. The CPU 56 judges whether a newly sought absolute rotation angle matches the absolute rotation angle that was obtained previously.

When both absolute rotation angles have matched, the CPU 56 continues the detection of the absolute rotation angle in accordance with the change of the detection value of each optical sensor 52a–52d. On the other hand, when both absolute rotation angles have not matched, the CPU 56 determines the absolute rotation angle sought from the code data of the R buffer 58 as an actual detection value, uses the sought absolute rotation angle as a reference and again detects the absolute rotation angle in accordance with the change of the detection value of each optical sensor 52a–52d.

Similarly, when the code data stored on the L buffer 59 matches one of the L buffer code data of the data table, the CPU 56 determines whether a newly sought absolute rotation angle matches the absolute rotation angle that was obtained previously.

The CPU 56 outputs fifty-six absolute rotation angles detected through a maximum resolution of about 6.4° as 6-bit angle data.

The operation of the rotation angle detector 50 will be now explained.

When the computer 55 is started up and the rotary shaft ST rotates in the clockwise direction by the angle (19.2°), which corresponds to three times the maximum resolution, in the condition when no code data stored on each of buffers 58 and 59, the CPU 56 produces a 6-bit code data corresponding to the rotation angle of the rotary shaft ST. The CPU 56 outputs angle data corresponding to the rotation angle of the rotary shaft ST based on the resultant code data.

When the rotary shaft ST further rotates in the clockwise direction, the CPU 56 detects an absolute rotation angle every rotation of the rotary shaft ST by the angle that corresponds to the maximum resolution (about 6.4°) and outputs corresponding angle data.

Also, when the rotary shaft ST rotates in the counterclockwise direction, the CPU 56 detects an absolute rotation angle every rotation of the rotary shaft ST by the angle that corresponds to the maximum resolution and outputs corresponding to angle data.

Therefore, even in the condition immediately after the computer 55 is started up and when the code data is not read on each of the buffers 58 and 59, the absolute rotation angle is detected through the rotation of the rotary shaft ST by the angle (19.2°) that corresponds to one and one-half times the maximum resolution in the clockwise or the counterclockwise direction from the absolute rotation angle in accordance with the maximum resolution (about 6.4°). Subsequently, as long as the computer is being operated, the absolute rotation angle is detected every rotation of the rotary shaft ST in the clockwise or the counterclockwise direction by an angle more than the maximum resolution (about 6.4°).

The rotation angle detector 50 of the second embodiment has the following advantages.

(1) The rotating plate 51 has only one annular detection area 53 provided with the detection segments for detecting the absolute rotation angle of the rotary shaft ST. Therefore, the outer diameter of the rotating plate 51 does not increase. This reduces the installation space required for the rotation angle detector 50.

(2) The detection holes 54a–54i and each optical sensor 52a–52d are arranged so that one of the detection values of the two optical sensors 52a and 52c and one of the detection values of the two optical sensors 52b and 52d change alternately every rotation of the rotating plate 51 by the angle that corresponds to one-half of the detection segment SE (about 6.4°). When one detection value obtained from the optical sensors 52a and 52c (or optical sensors 52b and 52d) is changed, the CPU 56 stores the detection value obtained from the other optical sensors 52b and 52d (or 52a and 52c) and generates a code data.

Therefore, even though the time when the detection value of one optical sensor 52a (or 52b) is changed is different from the time when the detection value of the other optical sensor 52c (or 52d) is changed due to inadvertent error in the finished size of the rotating plate 51 or the assembly error of each optical sensor 52a, 52c, it has never happened that two detection segments SE, which are originally detected by each of the optical sensors 52a and 52c, are not simultaneously detected. That is, the absolute rotation angle of the rotary shaft ST is accurately detected even when inadvertent error in the finished size of the rotating plate 51 or the assembly error of each optical sensor 52a, 52c occurs.

(3) The CPU 56 produces a code data for detecting the absolute rotation angle every rotation of the rotary shaft ST by the angle that corresponds to one-half of the detection segment SE (about 6.4°), in accordance with the detection value that is alternately detected by the optical sensors 52a and 52c or the optical sensors 52b and 52d. Therefore, the absolute rotation angle of the rotary shaft ST is detected with two times the resolution accuracy as compared with the resolution in which the code data is produced in accordance with only the detection value of the optical sensors 52a and 52c (about 12.8°). Therefore, the absolute rotation angle of the rotary shaft ST is detected with high accuracy.

(4) The code data is produced in accordance with the six successive detection segments SE at the detection area 53. Therefore, the optical sensors 52a–52d can be located close to each other. As a result, the support for each of the optical sensors 52a–52d can be made at one location.

(Third Embodiment)

Figure 18:
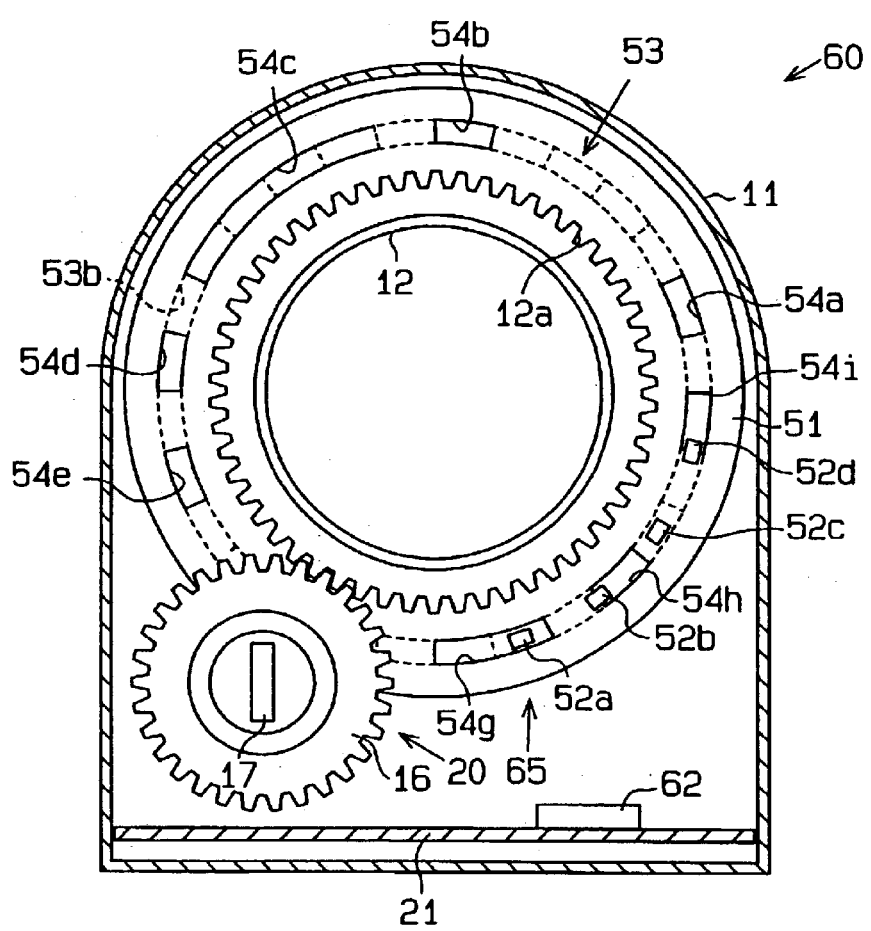
FIG. 18 is a schematic cross-sectional view illustrating a rotation angle detector according to the third embodiment of the present invention.

FIG. 18 is a schematic cross-sectional view of a rotation angle detector 60 of the third embodiment according to the present invention. In the third embodiment, the rotation angle detector 60 is used as a steer angle detector for detecting an absolute steer angle of a steering wheel of a vehicle.

As shown in FIG. 18, only an absolute signal encoder and a computer of the steer angle detector 60 are different from those of the steer angle detector 10 shown in FIG. 3A. An absolute signal encoder 65 (a first rotation angle detector) and a computer 62 of the steer angle detector 60 can be replaced with the absolute signal encoder 15 and a computer 22 shown in FIG. 3A, respectively.

The absolute signal encoder 65 (hereafter referred to as "encoder") includes a rotary shaft 12, a rotating plate (a first rotating body) 51 shown in FIG. 9 and four optical sensors 52a–52d.

The rotary shaft 12 is rotatably supported by the housing 11. The rotary shaft 12 is fixed to the steering shaft ST with the rotary shaft being fitted onto the steering shaft and rotates together with the steering shaft ST. A gear 12a is provided for the outer periphery of the rotary shaft 12. The rotating plate 51 is supported by the outer periphery of the rotary shaft 12 and rotates together with the rotary shaft 12.

The computer 62 includes a CPU 24A, a ROM 25A, and the R buffer 58 and the L buffer 59 shown in FIG. 14.

The ROM 25A stores a table showing the relationship between the absolute steer angle and the code value shown in FIG. 6 and code conversion table 26 (see FIG. 20). The code conversion table 26 is used for converting 6-digit code data (see FIG. 17) produced through the absolute signal encoder 65 to the code signal value that linearly changes with respect to the absolute steer angle shown in FIG. 5.

The CPU 24A receives a 6-digit code data from the absolute signal encoder 65, and converts the resultant 6-digit code data to the code value LC in accordance with the code conversion table 26. Subsequently, like the CPU 24 shown in FIG. 4, the CPU 24A detects an absolute steer angle of the steering shaft ST in accordance with the code value LC and the voltage value LV of the voltage signal SV in the range of the steer angle such as from −720° to 720°.

The steer angle detector 60 of the third embodiment has the following advantages.

The code data from the encoder 65 is converted to the code value LC and the absolute steer angle is detected in accordance with the code value LC and the voltage signal SV of the magnetic sensor 20. Therefore, detecting a steer angle ranging from −720° to 720° can be substantially obtained even when the absolute signal encoder 65 having the detected steer angle ranging from −360° to 360° is used.

It should be apparent to those skilled in the art that the present invention may be embodied in many other specific forms without departing from the spirit or scope of the invention.

In the first embodiment, the cycle of the voltage signal SV of the magnetic sensor 20 may be set so that a plurality of absolute steer angles, in which the data combination having the same code value LC and voltage value LV, is produced, do not exist in detecting the range of the absolute steer angle. For example, when an angle of one cycle of the voltage signal SV is set to the range of the steer angle from 241° to 359°, a plurality of absolute steer angles, in which the data combination having the same code value LC and voltage value LV is produced, never exist.

Figure 7:
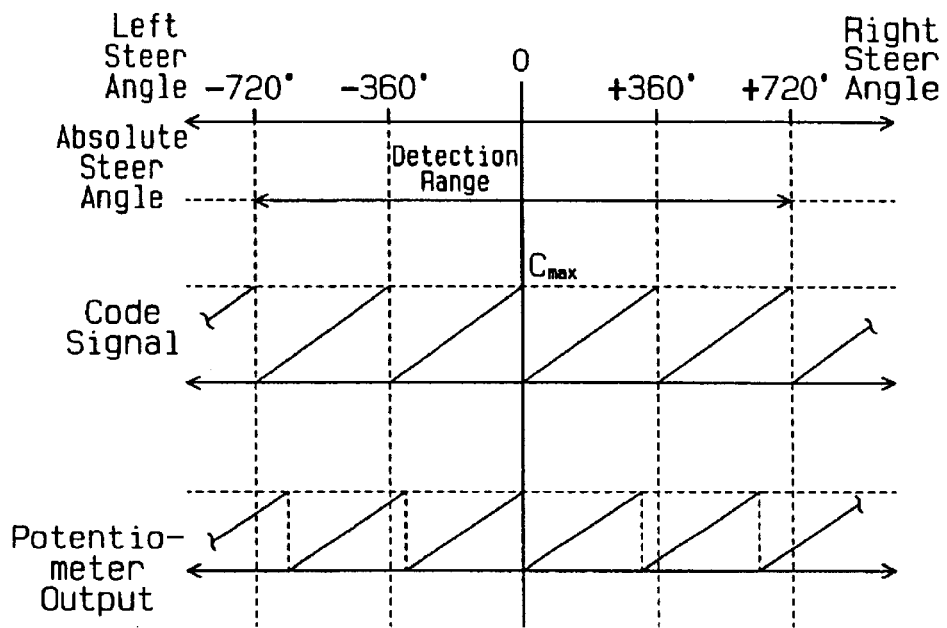
FIG. 7 is a graph showing the relationship of outputs of an encoder and a magnetic sensor with respect to the absolute steer angle of another rotation angle detector according to the first embodiment.

In the first embodiment, the analog signal type rotational displacement sensor may be a potentiometer or a rotational differential transformer. In such a case, the potentiometer is connected to the encoder 15 so that the input axis of the potentiometer rotates less than one complete rotation per one complete rotation of the rotating plate 13. As shown in FIG. 7, a cycle of the voltage signal SVP generated by the potentiometer is, for example, slightly smaller than the steer angle of 360°. At this time, the voltage value LVP of the voltage signal SVP corresponding to the code value LC is different in each of the detection ranges divided by one complete rotation of the encoder 15. In this case, since a plurality of the absolute steer angles in which the data combination of the same code value LC of the encode 15 and voltage value LVP of the potentiometer is produced do not exist, the absolute steer angle can be detected only through the combination of the code value LC and the voltage value LVP. This reduces the installation space required for the steer-angle detector compared with the case in which an additional encoder is provided with the encoder 15.

In the first embodiment, the first rotation angle detector may be an analog signal type rotation angle sensor (e.g., a potentiometer, a rotational differential transformer). In such a case, the gear provided for the outer periphery of the steering shaft ST may be meshed with, for example, a gear having the same teeth fixed to the input axis of the potentiometer. In addition, the gear of the potentiometer may be meshed with the gear 16 of the magnetic sensor 20. In such a case, the absolute steer angle may be detected by the data combination of the voltage value generated by the first rotation angle detector and the voltage value of the magnetic sensor 20.

In the first embodiment, the absolute signal encoder 15 may be a magnetic-type or laser-type.

Figure 8:
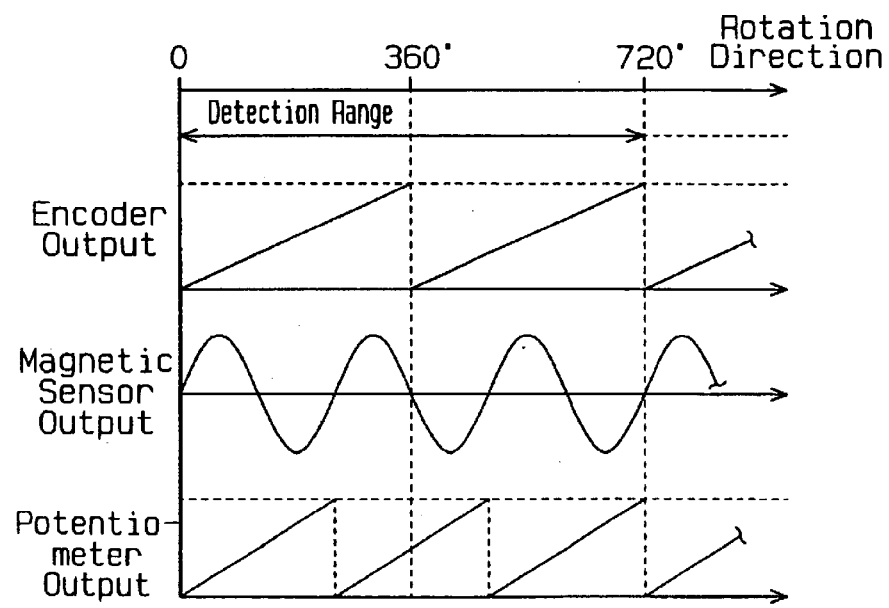
FIG. 8 is a graph showing the relationship of outputs of an encoder and a magnetic sensor with respect to the absolute steer angle of the another rotation angle detector according to the first embodiment.

In the first embodiment, as shown in FIG. 8, the absolute steer angle may be detected only when the detection body (the steering shaft ST) rotates in only one direction from the reference position.

In the first embodiment, the steer angle detector may be arranged so that a gear having the same teeth as the gear 12a is fitted onto the steering shaft ST and the gear meshes with the gear 12a. This reduces the installation space required for the steering shaft ST compared with the case in which two encoders are used.

The rotation angle detector of the first embodiment may be used as an absolute rotation angle detector for detecting an absolute rotation angle of the rotary shaft of a machine tool having a rotary shaft.

In the second embodiment, a detection segment SE, which is detected by each of the optical sensors 52a, 52c, 52b, and 52d during the rotation of the rotating plate 51 by the angle corresponding to the one and one-half times the segment SE, may not be six successive detection segments SE in the counterclockwise direction. For example, each optical sensor 52a–52d may be provided so that each is spaced apart from the adjacent sensor by the angle corresponding to two and one-half times the segment SE. Six non-consecutive segments may be detected during the rotation of the rotating plate 51 and code data may be produced from the resultant detection values. In this state, the code data that corresponds to the absolute rotation angle of the rotary shaft ST divided by the resolution corresponding to the detection segment SE may be read and the absolute rotation angle may be detected based on the resultant code data.

In the second embodiment, the code data produced by the detection values obtained from six detection segments SE may be the one that is able to detect the absolute rotation angle of the rotating plate 51 by the reference resolution. For example, the code data may be produced by detection values of the successive detection segments SE on the rotating plate 51 arranged in order along the clockwise direction. Alternatively, the code data may be produced by arranging detection values of the detection segments SE in predetermined order, thus not being limited to successive clockwise or counterclockwise order on the rotating plate 51.

In the second embodiment, any number, any size and any arrangement of the detection holes 54a–54i formed at the detection area 53 and any number and any arrangement of the optical sensors 52a–52d may be adopted as long as the code data corresponding to the absolute rotation angle of the rotating plate 51 divided with the predetermined resolution may be produced.

In the second embodiment, the absolute rotation angle may be detected based on the code data stored on each of the buffers 58 and 59 and the change of the detection values obtained from each of the optical sensors 52a, 52c, 52b, and 52d, as needed, even after the computer 55 is started up and the absolute rotation angle of the rotary shaft ST is initially detected.

In the second embodiment, when one of the detection values of the optical sensors 52a and 52c is changed, the code data may be produced only from the detection values obtained from the optical sensors 52b and 52d without using the detection values of the optical sensors 52a and 52c. In this case, the initial code data may be produced after the computer 55 is started up and the rotating plate 51 rotates by the angle corresponding to three times the detection segments SE.

In the second embodiment, a plurality of optical sensors may be provided with each being spaced apart from an adjacent one by an angle corresponding to one detection segment or a plurality of detection segments SE. Alternatively, a plurality of detection holes may be provided so that one of the detection values of each optical sensor is changed when the rotating plate 51 rotates by an angle corresponding to the detection segment SE. One of the detection values is changed for every rotation of the rotating plate 51 by the angle corresponding to the detection segment SE. Therefore, the computer 55 may produce code data based on such changed values. In this case, the absolute rotation angle of the rotary shaft ST may be accurately detected even in the condition in which the rotating plate 51 has the inadvertent error in finished size or each optical sensor 52a or 52c has been assembled with error.

In the second embodiment, the maximum resolution is set to 1° and the code data may be produced with 10-bit angle data as 1° is considered as 1 bit. In this case, the interval between each of the optical sensors 52a–52d is widened, and the number of the detection segments SE is set to 180. The CPU may receive a detection value of the optical sensor of more than 8 bits.

In the second embodiment, the code data stored on the R buffer 58 when the rotating plate 51 rotates in the counterclockwise direction and the code data stored on the L buffer 59 when the rotating plate 51 rotates in the clockwise direction may be different from each of the twenty-eight detection code data created at the detection area 53. In this case, when the rotary shaft ST rotates such as in the clockwise direction after the computer 55 is started up, both code data initially stored on the R buffer 58 and the L buffer 59 are not identical. Therefore, no condition occurs in which the absolute rotation angle cannot be determined.

In the second embodiment, a plurality of detection areas may be provided so that code data may be created from detection values obtained by a plurality of optical sensors provided for each detection area. In this case, when at least one detection value obtained by the plurality of optical sensors provided for each detection area is changed, the code data may be produced from detection values of the other optical sensors.

In the second embodiment, the detection device may be a magnetic pole provided for the surface or the peripheral end surface of the rotating plate 51 and the detector may be a magnetic sensor outputting a detection signal based on the presence or absence of the magnetic pole. The detection device may be a reflecting membrane provided for the surface or the peripheral end surface of the rotating plate 51 and the detector may be a reflection optical sensor outputting a detection signal based on the present or absence of reflection light emitted from the reflection membrane.

What is claimed is:

1. An apparatus for detecting an absolute rotation angle of a detection body, the apparatus comprising:
   a first rotation angle detector connected to said detection body for generating a first detection signal having a cycle corresponding to the rotation of said detection body, wherein said first rotation angle detector includes a first rotating body that is connected to said detection body and rotates together with said detection body;
   a second rotation angle detector connected to said first rotation angle detector;
   said second rotation angle detector including a second rotating body that rotates together with said first rotating body and generating a second detection signal having a cycle corresponding to the rotation of said second rotating body in accordance with the rotation of said second rotating body, wherein the rotation rate of said second rotating body is greater than that of said first rotating body;
   a control device connected to said first rotation angle detector and said second rotation angle detector for detecting an absolute rotation angle of said detection body in accordance with said first detection signal and said second detection signal, wherein:
   said absolute rotation angle is determined based on the combination of a value of said first detection signal and a value of said second detection signal; and
   when there is an absolute rotation angle having the same combination of the value of said first detection signal and the value of said second detection signal, said control device specifies an absolute rotation angle based on the relationship between the change of the value of said first detection signal and the change of the value of said second detection signal.

2. The apparatus for detecting a rotation angle according to claim 1, wherein
   said first rotating body is fitted Onto said detection body, said first rotating body includes a plurality of detection holes formed at the periphery of said detection body, and
   said first rotation angle detector comprises an absolute signal encoder and includes a plurality of sensors for detecting said plurality of detection holes and generating a code signal corresponding to an absolute rotation angle of said detection body as said first detection signal.

3. The apparatus for detecting a rotation angle according to claim 2, wherein
   said second rotation angle detector includes an analog signal type rotation angle sensor for generating said second detection signal as an analog signal.

4. The apparatus for detecting a rotation angle according to claim 3, wherein said second rotation angle detector includes:
   a permanent magnet fixes to said second rotating body for generating magnetic flux; and
   a magnetic resistive element provided opposing said permanent magnet for generating a sinusoidal analog signal in accordance with the change of said magnetic flux caused by the rotation of said permanent magnet.

5. The apparatus for detecting a rotation angle according to claim 1, wherein:
   said first rotating body includes a plurality of detection holes provided for the periphery of said detection body, and non-hole detection parts are defined between adjacent detection holes;
   each of said detection holes has at least one first detection segment and each of said non-hole detection parts has at least one second detection segment;
   said first rotation angle detector detects said first and second detection segments based on the rotation of said first rotating body and includes a plurality of detection devices for generating a plurality of binary signals as said first detection signal; and
   said control device is connected to said plurality of detection devices and generates a data code corresponding to the absolute rotation angle of said detection body in accordance with each of said binary signals, wherein said control device changes the data code based on at least one signal conversion in said plurality of binary signals due to the rotation of said detection body by a predetermined rotation angle, and determines an absolute rotation angle of said detection body in accordance with said data code and said second detection signal.

6. An apparatus for detecting an absolute rotaiton angle of a detection body, the apparatus comprising:

a rotating plate being connected to said detection body and rotating together with said detection body;

said rotating plate including a plurality of detection holes provided for the periphery of said detection body and defining non-hole detection parts between adjacent detection holes thereof;

each of said detection holes having at least one first detection segment and each of said non-hole detection parts having at least one second detection segment;

a plurality of detection devices detecting said first and second detection segments based on the rotation of said rotating plate and generating a plurality of binary signals; and a control device connected to said plurality of detection devices and generating a data code corresponding to an absolute rotation angle of said detection body in accordance with each of said binary signals, wherein said control device changes the data code based on at least one signal conversion in said plurality of binary signals due to the rotation of said detection body by a predetermined rotation angle, and determines said absolute rotation angle in accordance with said data code.

7. The apparatus for detecting a rotation angle according to claim 6, wherein:

said plurality of detection devices includes first detection devices and second detection devices;

said first detection devices generate first binary signals and said second detection devices generate second binary signals; and said first detection devices and said second detection devices generate said first binary signals and said second binary signals, respectively, so that values of said first and second binary signals alternately switch for each rotation of said detection body by a predetermined amount of the rotation angle.

8. The apparatus for detecting a rotation angle according to claim 7, wherein said data code is set on said rotating plate in accordance with the arrangement of said plurality of detection holes and said plurality of non-hole detection parts.

9. The apparatus for detecting a rotation angle according to claim 7, wherein said rotating plate includes a detection area having a plurality of first segments and a plurality of second segments.

10. The apparatus for detecting a rotation angle according to claim 6, wherein said data code is set on said rotating plate in accordance with the arrangement of said plurality of detection holes and said plurality of non-hole detection parts.

11. The apparatus for detecting a rotation angle according to claim 10, wherein said plurality of detection holes and said plurality of non-hole detection parts are arranged so that different data codes are generated through a rotation angle range of 360 degrees.

12. The apparatus for detecting a rotation angle according to claim 10, wherein said rotating plate includes a detection area having a plurality of first segments and a plurality of second segments.

13. The apparatus for detecting a rotation angle according to claim 6, wherein said rotating plate includes a detection area having a plurality of first segments and a plurality of second segments.

14. The apparatus for detecting a rotation angle according to claim 6, wherein said plurality of detection devices are concentrically and circumferentially arranged.

15. An apparatus for detecting an absolute rotation angle of a detection body, comprising:

a rotating plate being connected to said detection body and rotating together with said detection body;

said rotating plate including a plurality of first detection parts provided for the periphery of said detection body and defining a plurality of second second detection parts between adjacent said first detection parts thereof;

each of said first detection parts having at least one first detection segment and each of said second detection parts having at least one second detection segment, and a reference rotation angle being defined based on said first and second detection segments;

a plurality of detection devices detecting said first and second detection segments based on the rotation of said rotating plate and generating a plurality of binary signals, said plurality of detection devices including first detection devices and second detection devices;

said plurality of detection devices being arranged so that the condition in which one of said first detection parts and said second detection parts is detected is switched to the condition in which the other of said first detection parts and said second detection parts is detected for each rotation of said rotating plate by a first rotation angle, and said first rotation angle being set to a value obtained by dividing said reference rotation angle by a positive integer; and a control device connected to said plurality of detection devices, generating code data corresponding to an absolute rotation angle of said detection body in accordance with said binary signals generated by any one of said first detection parts and said second detection parts for each rotation of said rotating plate by said first rotation angle, and storing said code data, wherein said control device stores second binary signals generated by said second detection devices as code data when first binary signals generated by said first detection devices are changed based on the rotation of said detection body by said first rotation angle and also stores the first binary signals when the second binary signals generated by said second detection devices are changed, and wherein said control device determines said absolute rotation angle in accordance with said code data stored during the rotation of said detection body by a second rotation angle that is set at a predetermined positive integer multiple of said first rotation angle.

16. The apparatus for detecting a rotation angle according to claim 15, wherein said first rotation angle is one-half of said reference rotation angle; and said first detection devices and said second detection devices alternately detect a boundary part of said first detection part and said second detection part for each rotation of said detection body by said first rotation angle.

17. The apparatus for detecting a rotation angle according to claim 16, wherein said rotating plate includes a detection area having a plurality of first and second detection segments.

18. The apparatus for detecting a rotation angle according to claim 16, wherein:

said plurality of first detection parts include a plurality of detection holes penetrating said rotating plate and said plurality of second detection parts include a plurality of non-hole detection parts that are not provided with the detection hole;

said plurality of detection devices include optical sensors that detect light passing through said detection holes; and said data code is set on said rotating plate in accordance with the arrangement of said plurality of detection holes and said plurality of non-hole detection parts.

19. The apparatus for detecting a rotation angle according to claim 15, wherein
said rotating plate includes a detection area having a plurality of first and second detection segments.

20. The apparatus for detecting a rotation angle according to claim 15, wherein:
said plurality of first detection parts include a plurality of detection holes penetrating said rotating plate and said plurality of second detection parts include a plurality of non-hole detection parts that are not provided with the detection holes;
said plurality of detection devices include optical sensors that detect light passing through said detection holes; and
said data code is set on said rotating plate in accordance with the arrangement of said plurality of detection holes and said plurality of non-hole detection parts.

21. The apparatus for detecting a rotation angle according to claim 15, wherein said first detection devices and said second detection devices are concentrically and circumferentially arranged.

* * * * *

UNITED STATES PATENT AND TRADEMARK OFFICE
CERTIFICATE OF CORRECTION

PATENT NO. : 6,848,187 B2
DATED : February 1, 2005
INVENTOR(S) : Ito et al.

It is certified that error appears in the above-identified patent and that said Letters Patent is hereby corrected as shown below:

Column 20,
Line 36, change "fixes" to -- fixed --;
Line 66, change "rotaiton" to -- rotation --; and Column 22,
Line 5, delete the second occurrence of the word "second".

Signed and Sealed this

Third Day of May, 2005

JON W. DUDAS
*Director of the United States Patent and Trademark Office*